(12) United States Patent
Bradley

(10) Patent No.: US 10,546,560 B2
(45) Date of Patent: Jan. 28, 2020

(54) SYSTEMS AND METHODS FOR PRESENTING VIRTUAL CONTENT IN A VEHICLE

(71) Applicant: UATC, LLC, San Francisco, CA (US)

(72) Inventor: David McAllister Bradley, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 0 days.

(21) Appl. No.: 15/807,932

(22) Filed: Nov. 9, 2017

(65) Prior Publication Data

US 2019/0130878 A1    May 2, 2019

Related U.S. Application Data

(60) Provisional application No. 62/579,505, filed on Oct. 31, 2017.

(51) Int. Cl.

| | |
|---|---|
| *G09G 5/38* | (2006.01) |
| *G06T 19/00* | (2011.01) |
| *G09G 5/14* | (2006.01) |
| *B60K 35/00* | (2006.01) |
| *B60W 50/14* | (2012.01) |

(Continued)

(52) U.S. Cl.
CPC .............. *G09G 5/38* (2013.01); *B60K 35/00* (2013.01); *B60W 50/14* (2013.01); *G01C 21/365* (2013.01); *G01C 21/3635* (2013.01); *G01C 21/3697* (2013.01); *G09G 5/14* (2013.01); *H04W 4/029* (2018.02); *B60K 2350/106* (2013.01); *B60K 2350/2065* (2013.01); *B60K 2350/352* (2013.01); *B60K 2370/152* (2019.05); *B60K 2370/1529* (2019.05); *B60K 2370/175* (2019.05); *B60K 2370/31* (2019.05); *B60K 2370/52* (2019.05); *G09G 2370/045* (2013.01); *G09G 2370/06* (2013.01); *G09G 2380/10* (2013.01); *H04W 4/40* (2018.02)

(58) Field of Classification Search
CPC ................................. G09G 5/38; G06T 19/006
See application file for complete search history.

(56) References Cited

U.S. PATENT DOCUMENTS

| | | |
|---|---|---|
| 8,346,426 B1 | 1/2013 | Szybalski et al. |
| 2011/0199361 A1* | 8/2011 | Shin ...................... G06F 1/1616 |
| | | 345/211 |

(Continued)

OTHER PUBLICATIONS

International Search Report and Written Opinion for Application No. PCT/US2018/058163, dated Jan. 18, 2019, 13 pages.

*Primary Examiner* — Yi Yang
(74) *Attorney, Agent, or Firm* — Dority & Manning, PA

(57) ABSTRACT

Systems and methods for presenting virtual content are provided. In one example embodiment, a computer-implemented method includes obtaining, by a computing system including one or more computing devices, data indicative of virtual content. The method includes obtaining, by the computing system, data indicative of a planned motion of an autonomous vehicle. The method includes determining, by the computing system, a location for the virtual content within a virtual environment based at least in part on the data indicative of the planned motion of the autonomous vehicle. The method includes providing for display, by the computing system via one or more display devices, the virtual content at the location within the virtual environment.

19 Claims, 8 Drawing Sheets

(51) Int. Cl.
*G01C 21/36* (2006.01)
*H04W 4/029* (2018.01)
*H04W 4/40* (2018.01)

(56) References Cited

U.S. PATENT DOCUMENTS

| | | | |
|---|---|---|---|
| 2015/0187098 A1* | 7/2015 | Ofstad | G06T 11/60 345/629 |
| 2015/0247734 A1* | 9/2015 | Okada | G01C 21/34 701/423 |
| 2017/0039764 A1 | 2/2017 | Hu et al. | |
| 2017/0103571 A1 | 4/2017 | Beaurepaire | |
| 2018/0089901 A1* | 3/2018 | Rober | G06K 9/00832 |
| 2019/0017839 A1 | 1/2019 | Eyler et al. | |
| 2019/0019329 A1 | 1/2019 | Eyler et al. | |

* cited by examiner

SYSTEMS AND METHODS FOR PRESENTING VIRTUAL CONTENT IN A VEHICLE

PRIORITY CLAIM

The present application is based on and claims priority to U.S. Provisional Application 62/579,505 having a filing date of Oct. 31, 2017, which is incorporated by reference herein.

FIELD

The present disclosure relates generally to generating and displaying virtual content for a user of a vehicle.

BACKGROUND

Virtual reality is a computer technology that replicates an environment, real or imagined, and simulates a user's physical presence to allow for user interaction. Virtual realities artificially create sensory experiences, which can include sight, touch, hearing, and smell, and are displayed either on a computer screen or with a special virtual reality headset. Augmented reality displays a view of a physical, real-world environment whose elements are supplemented by computer-generated sensory input such as sound, video, graphics, or GPS data. Thus, the technology functions by enhancing one's current perception of reality.

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for presenting virtual content. The method includes obtaining, by a computing system including one or more computing devices, data indicative of virtual content. The method includes obtaining, by the computing system, data indicative of a planned motion of an autonomous vehicle. The method includes determining, by the computing system, a location for the virtual content within a virtual environment based at least in part on the data indicative of the planned motion of the autonomous vehicle. The method includes providing for display, by the computing system via one or more display devices, the virtual content at the location within the virtual environment.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of virtual content. The operations include obtaining data indicative of a planned motion of an autonomous vehicle. The operations include determining a first location for the virtual content within a virtual environment based at least in part on the data indicative of the planned motion of the autonomous vehicle. The first location is associated with a first route segment of a vehicle route of the autonomous vehicle. The operations include providing for display, via one or more display devices, the virtual content at the first location within the virtual environment.

Yet another example aspect of the present disclosure is directed to one or more tangible, non-transitory computer-readable media storing computer-readable instructions that when executed by one or more processors cause the one or more processors to perform operations. The operations include obtaining data indicative of virtual content. The operations include obtaining data indicative of a planned motion of a vehicle. The operations include determining a location for the virtual content within a virtual environment based at least in part on the data indicative of the planned motion of the vehicle. The operations include providing for display, via one or more display devices, the virtual content at the location within the virtual environment.

Other example aspects of the present disclosure are directed to systems, methods, vehicles, apparatuses, tangible, non-transitory computer-readable media, and memory devices for presenting virtual content.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
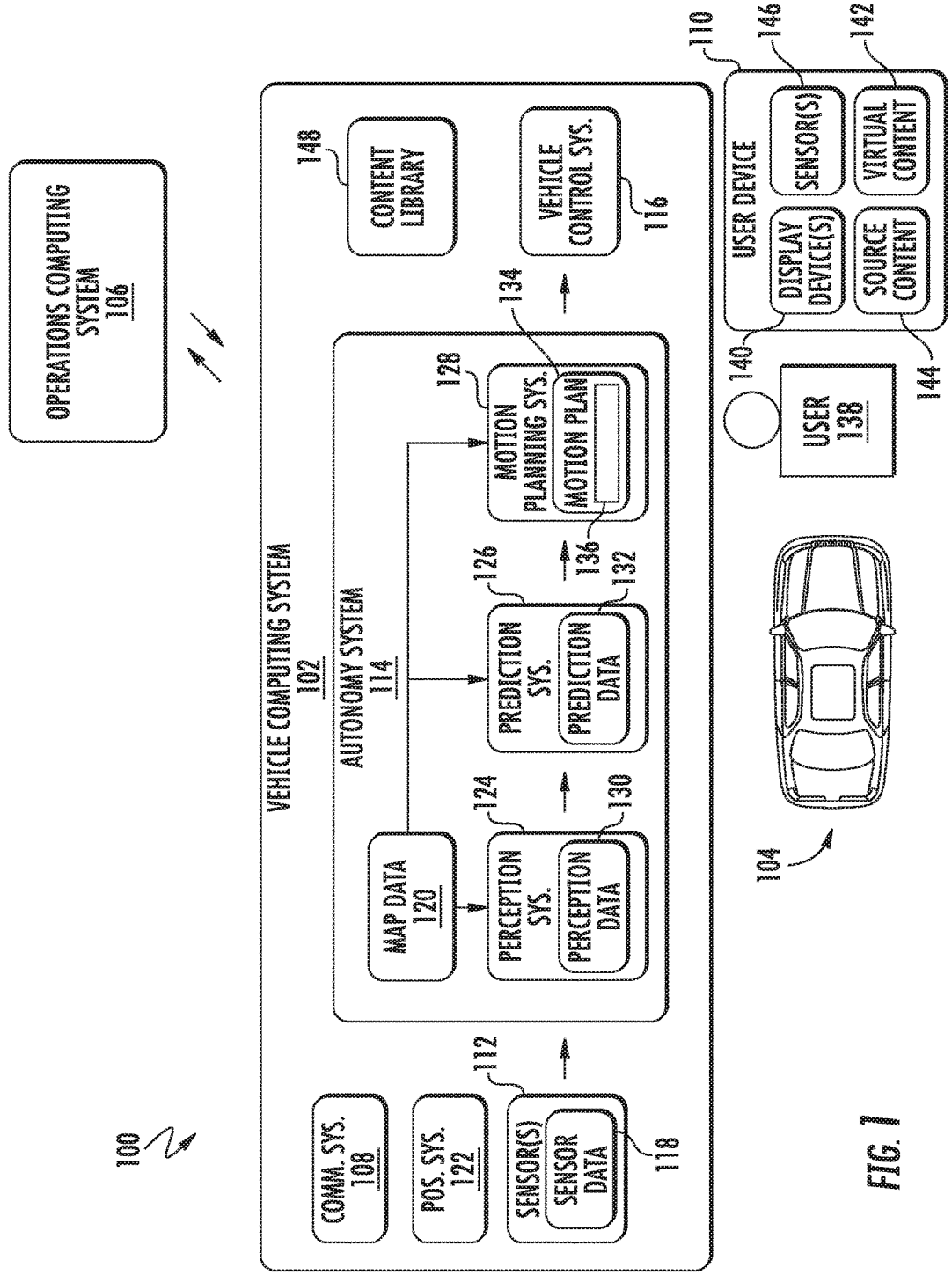
FIG. 1 illustrates an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improving the presentation of virtual content for a user within an autonomous vehicle. An autonomous vehicle can be a vehicle that can drive, navigate, operate, etc. without human input. Because the autonomous vehicle can safely operate without human input, a user of the autonomous vehicle (e.g., a rider) may perform other activities while in the vehicle. For instance, the user may operate a user device such as, for example, a virtual realty headset that creates a virtual environment for a user. The user device can obtain source content and render the source content as virtual content within a virtual environment for the user (e.g., a virtual reality environment, an augmented reality environment, etc.). By way of example, the user device can obtain source content such as a two-dimensional video (e.g., from an accessible memory) and render the two-dimensional video as virtual content for the user to view in the virtual environment. However, disorientation between visual motion of the virtual content (e.g., the rendered video) and the movement of the autonomous vehicle can cause motion sickness for the user.

The systems and methods of the present disclosure can reduce such motion sickness by leveraging the autonomous motion planning operations of the autonomous vehicle. By way of example, the user device can obtain data indicative of the planned motion of the vehicle. This can include data indicative of a planned vehicle route and/or the vehicle's planned motion trajectory. The user device can determine a location for the virtual content within a virtual environment (e.g., being viewed by the user) based at least in part on the planned motion of the vehicle. By way of example, the user device can determine that the autonomous vehicle is to travel along a first route segment of a vehicle route with a certain heading (e.g., along a first street in a northward direction). Accordingly, the user device can position the virtual content within a virtual environment in the direction of vehicle's travel of the along the first route segment. The virtual content can be depicted within a virtual screen (e.g., at the determined location), which is stationary with respect to the world outside of the autonomous vehicle. As the vehicle travels along the vehicle route from the first route segment to a second route segment (e.g., along a second street in an eastward direction), the user device can determine a second location for the virtual content within the virtual environment. This can include, for example, a second virtual screen positioned in accordance with the second route segment. As the autonomous vehicle transitions (e.g., via a right turn) to the second route segment, the user device can help transition the user from viewing the virtual content at the first location (e.g., on the first virtual screen) to viewing the virtual content at the second location (e.g., on the second virtual screen). For example, the user device may render virtual indicators instructing the user to look to the right within the virtual environment to view the second virtual screen. The user device can also render a visual representation of the vehicle's planned future motion within the virtual environment (e.g., a virtual path, etc.) to indicate the vehicle's upcoming actions. Accordingly, the systems and methods of the present disclosure can reduce a user's motion sickness by providing the user with contextual information regarding the vehicle's planned trajectory while also keeping the virtual content in line with the vehicle's direction of travel. Additionally, the present disclosure can improve the efficiency of rendering and displaying virtual content by minimizing the number of transitions needed between virtual content.

An autonomous vehicle can be a ground-based autonomous vehicle (e.g., car, truck, bus, etc.) or another type of vehicle (e.g., aerial vehicle) that can operate with minimal and/or no interaction from a human operator. For example, an autonomous vehicle can include an onboard vehicle computing system for operating the vehicle (e.g., located on or within the autonomous vehicle). The vehicle computing system can receive sensor data from vehicle sensor(s) onboard the vehicle (e.g., exterior cameras, LIDAR, RADAR), attempt to comprehend the vehicle's surrounding environment by performing various processing techniques on the sensor data, and generate an appropriate motion plan through the vehicle's surrounding environment. The motion plan can include a planned motion trajectory of the autonomous vehicle that indicates a current and/or future motion trajectory to be followed by the autonomous vehicle.

The vehicle computing system can obtain data indicative of a vehicle route along which the autonomous vehicle is to travel (e.g., to arrive at a destination). The vehicle route can include a plurality of route segments. Each route segment can be indicative of a distinct portion of the vehicle route. For example, a route segment can be associated with a portion of the vehicle route that travels straight along a first street in a northward direction and another route segment can be associated with another portion of the vehicle route that travels along a second street in an eastward direction. In some implementations, the vehicle route (and the plurality of route segments) can be determined onboard the autonomous vehicle.

In some implementations, the vehicle route can be determined off-board the autonomous vehicle (e.g., at a remote location). For example, an entity (e.g., service provider, owner, manager, etc.) can use one or more autonomous vehicles to provide a vehicle service such as a transportation service (e.g., rideshare service), a courier service, a delivery service, etc. A user can make a request for a vehicle service via a cloud based operations computing system that is remote from the autonomous vehicle fleet. The operations computing system can select an autonomous vehicle to provide the requested vehicle service. Moreover, the selected autonomous vehicle can obtain data indicative of a vehicle route to the location of the user from the operations computing system (e.g., via one or more wireless networks). Upon arrival, the user may board the autonomous vehicle (e.g., for a transportation service).

As the user rides in the autonomous vehicle, the user may utilize a user device. The user device can be a computing system that includes a virtual/augmented reality display system such as, for example, a head-mounted display unit that is worn by the user located within an interior of the autonomous vehicle. In some implementations, such a device can be permanently located within the autonomous vehicle. In some implementations, the user device can be temporarily located within the autonomous vehicle. For example, the virtual/augment reality display system can include a mobile phone of the user that can be coupled to a light weight, inexpensive head-mount device for a virtual user experience and/or other head-mounted display systems that can present virtual content to a user. The user device can include a software application (e.g., downloaded to a local memory) that can be launched when a user desires to view virtual content (e.g., when the user is in the interior of the vehicle, etc.). For example, the user device can connect to a network of the autonomous vehicle when within the vehicle (e.g., a vehicle provided Wi-Fi network, etc.) and can launch the software application in the event the user desires to view virtual content while riding in the autonomous vehicle.

The user device can be configured to create a virtual environment for the user. For example, the user device can create a virtual environment that the user can view via one or more display devices. In some implementations, the virtual environment can be a virtual reality environment. For example, the user device can create a virtual movie theater such that it appears as if the user is sitting in a movie theater, rather than the vehicle. In some implementations, the virtual environment can be an augmented reality environment. For example, the user device can create a virtual environment that depicts at least a portion of the interior of the autonomous vehicle with augmented and/or overlaid features.

The user device can obtain data indicative of virtual content. For instance, user device can generate virtual content that can be rendered via one or more display devices (e.g., display screens) of the user device. The user device can obtain data indicative of source content to be rendered as virtual content. The source content can include two-dimensional visual content that can be rendered as virtual content (e.g., two-dimensional virtual content). For example, the source content can include videos, user interfaces, web browsers, games, etc. The source content can be obtained from a variety of sources. In some implementations, the user device can obtain the source content from a local accessible memory of the user device and/or a memory that is remote from the user device (e.g., accessible via the software application). In some implementations, the user device can obtain the source content from the vehicle (e.g., from a content library cached locally on the vehicle).

In some implementations, the user device can obtain source content from another user device. For instance, the user device can obtain data from another user device located within the vehicle. By way of example, the user may have a laptop, tablet, and/or other user device within the interior of the vehicle. The user device can obtain data indicative of the source content (e.g., a user interface) from the other user device. The user device can render the source content as virtual content within a virtual environment.

The user device can also obtain data indicative of a planned motion of the autonomous vehicle. The data indicative of the planned motion can include data indicative of a planned vehicle route of the autonomous vehicle and/or a planned motion trajectory of the autonomous vehicle. The vehicle computing system can provide the data indicative of the planned vehicle route and/or planned motion trajectory (e.g., as determined by the vehicle's motion planning system) to the user device (e.g., via a wired and/or wireless network). The user device can obtain the data indicative of the planned motion trajectory as the vehicle autonomously navigates through its surroundings. Moreover, the data indicative of the motion trajectory can be updated in in real-time and/or at least near-real-time (e.g., accounting for any transmission, processing, and/or other delays) as the vehicle route changes and/or the motion planning system iteratively determines the trajectory of the vehicle.

The user device can determine a location for the virtual content within a virtual environment based at least in part on the data indicative of the planned motion of the autonomous vehicle. For instance, the user device can process the data indicative of the planned motion to determine one or more vehicle parameters. The vehicle parameter(s) can be indicative of the various types of information associated with the current and/or future motion of the vehicle. For example, the vehicle parameter(s) can be indicative of a current and/or future: vehicle heading, locations/orientations of vehicle route segment(s), length of route segment(s), vehicle position along the vehicle route and/or route segment(s), vehicle speed/velocity, vehicle acceleration, vehicle action(s) (e.g., merge, lane change, pull-over, etc.), and/or other parameters.

The user device can determine a location of the virtual content within the virtual environment based at least in part on the vehicle parameter(s). The location can be chosen in a manner that helps reduce the motion sickness of the user viewing the virtual content. For instance, the location of the virtual content within the virtual environment can be based at least in part on the heading of the vehicle. By way of example, the virtual content can be positioned in the direction of the vehicle's motion as it travels along a first route segment so that the user looks in the same direction that the vehicle is moving in order to view the virtual content. Moreover, the virtual content can be located at an appropriate viewing angle (e.g., 20-40 degrees, user-adjusted, etc.) and an appropriate viewing range (e.g., infinite viewing range). The virtual content can be stationary with respect to the exterior surrounding environment of the autonomous vehicle.

The user device can provide for display (e.g., via one or more display devices) the virtual content at the determined location within the virtual environment. For instance, the virtual content can be displayed within a virtual screen. A virtual screen can be associated with a route segment of the vehicle route. The user device can obtain data indicative of a vehicle route of the autonomous vehicle (e.g., from the vehicle's computing system). As described herein, the vehicle route can include a plurality of route segments. The user device can generate a virtual screen for each route segment. A virtual screen can be a finite space within the virtual environment that depicts rendered virtual content (e.g., like a virtual movie screen, virtual computer screen, etc.). By way of example, a virtual screen can depict a two-dimensional video for the user and/or a game for the user while riding in the autonomous vehicle. Additionally, or alternatively, the virtual screen can depict a user interface by which the user can enter text (e.g., a word processing user interface), create a document (e.g., build a presentation slide deck), browse the internet (e.g., a web browser), and/or perform other activities.

A virtual screen can be displayed within the virtual environment based at least in part on the vehicle route. For example, the virtual content can be included in a first virtual screen associated with a first route segment as the autonomous vehicle travels along the first route segment. The first virtual screen can depict the rendered source content (e.g., a video, user interface, etc.).

The user device can position the virtual screen(s) within the virtual environment in a manner that helps reduce user motion sickness. For instance, a virtual screen can be positioned at an appropriate viewing angle (e.g., 20-40 degrees, user-adjusted, etc.) and an appropriate viewing range (e.g., infinite viewing range). Moreover, a virtual screen can be fixed/stationary with respect to the exterior surrounding environment of the vehicle (e.g., on the horizon), as opposed to being stationary with respect to the interior of the vehicle. This can ensure that the virtual content corresponds to the motion of the vehicle with respect to the outside world. The position of a virtual screen can also be based at least in part on the heading of the vehicle. For example, the user device can obtain data indicative of the heading of the vehicle (e.g., from its own inertial sensors, from planned vehicle motion data, etc.). The user device can position the first virtual screen within the virtual environment based at least in part on the heading of the vehicle. For instance, the first virtual screen can be positioned in the direction of the vehicle's motion as it travels along the first route segment so that the user looks in the same direction that the vehicle is moving in order to view the virtual content. By way of example, a user may desire to utilize a laptop while riding in the vehicle (e.g., for a transportation service). The laptop may include a screen-sharing software application that enables the laptop to provide data indicative of a video, user interface, and/or other content to the user device. The user device (e.g., the software application downloaded thereto) can render the video, user interface, etc. on a first virtual screen in front of the user in the direction of the vehicle's travel and at infinite viewing range that is stationary in world coordinates.

The user device can determine additional locations for the virtual content within the virtual environment as the autonomous vehicle travels. For instance, the user device can determine a second location for the virtual content within the virtual environment based at least in part on the data indicative of the planned motion of the autonomous vehicle. By way of example, while the autonomous vehicle travels along the first route segment, the user device can determine that the autonomous vehicle is going to begin traveling along the second route segment (e.g., in a few seconds) based at least in part on the vehicle route and/or the planned motion trajectory. The autonomous vehicle may, for example, plan a right turn action such that the autonomous vehicle will adjust from traveling along the first street (e.g., in the northward direction) to traveling along the second street (e.g., in the eastward direction). The heading of the autonomous vehicle along the second route segment (e.g., the second street) may be ninety degrees to the right of the first route segment (e.g., the first street). Accordingly, the user device can determine that the second location of the virtual content within the virtual environment should be at a position ninety degrees to the right of the first location. In some implementations, the user may adjust his/her field of view (e.g., by turning the user's head and head mounted user device) ninety degrees to the right in order to view the virtual content that the second location within the virtual environment. In some implementations, in the event that the user maintains the same field of view in the virtual environment as the autonomous vehicle turns (e.g., the user maintains a head position that faces straight toward the front of the vehicle), the virtual content at the second location can slide into the user's field of view, as the vehicle turns onto the second route segment. The user device can provide for display (e.g., via the one or more display devices) the virtual content at the second location within the virtual environment.

In some implementations, the user device can generate a second virtual screen for the second route segment of the vehicle route (e.g., during which the autonomous vehicle is to travel along a second street in an eastward direction). The second virtual screen can depict the virtual content rendered by the user device (e.g., a video, user interface). Moreover, the second virtual screen can be positioned in accordance with the second route segment (e.g., ninety degrees to the right of the first route segment).

The user device can present visual transitions to help aid the user's transition from viewing the virtual content at the first location to viewing the virtual content at the second location. For example, the visual transitions can lead the user to transition from viewing one virtual screen to another. In some implementations, this can include discrete visual transitions that indicate to the user that there is an upcoming change in vehicle motion (e.g., from a first route segment to a second route segment). The visual transitions can prime the user to handle the future motion of the autonomous vehicle (e.g., by tensing muscles as appropriate) and further reduce motion sickness. For example, while the autonomous vehicle travels along the first route segment, the user device can determine that the autonomous vehicle is going to begin traveling along the second route segment (e.g., in a few seconds) based at least in part on the vehicle route and/or the planned motion trajectory. The user device can provide for display (e.g., within the virtual environment) one or more indicators (e.g., arrows, text, symbols, etc.) directing the user to adjust the position of the user's head/eyes in accordance with the motion of the autonomous vehicle. For example, as the autonomous vehicle is approaching the right turn from a first street to a second street, the user device can provide a visual indicator within the virtual environment perceived by the user that instructs the user to look and/or turn his/her head to the right. Accordingly, the user can look and/or turn his/her head (e.g., and the head mounted display unit) to the right to view the virtual content at the second location within the virtual environment (e.g., that corresponds to the second route segment).

In another example, on a high speed right turn (e.g., with two m/s of lateral acceleration), the visual indicator(s) can be provided to direct the user's attention to the right slightly before the turn starts so that the user's head orientation is more in line with the acceleration vector the user will experience. This can be similarly applied for longitudinal accelerations and/or decelerations (e.g., braking) of the vehicle. In some implementation, if the user in not looking forward (e.g., if the user is looking downward at a virtual keyboard), the visual indicator(s) can direct the user's attention forward shortly before the vehicle intends to accelerate.

The transition can be presented in a variety of additional, or alternative, manners. In some implementations, the user device can provide a visual transition from the first virtual screen to the second virtual screen (e.g., at least as the vehicle travels from the first route segment onto the second route segment). For example, the visual transition can be based at least in part on the position of the user's head. One or more vehicle sensors within the interior of the autonomous vehicle and/or inertial sensors of the user device can track the motion of the user's head. The user device can obtain such data and present the visual transition accordingly. For example, as the user's head turns to the right, the second virtual screen can begin to display within the virtual environment. In some implementations, once the user's head completely turns away from the first virtual screen, the user device can remove the first virtual screen from the virtual environment (e.g., such that the user cannot turn his/her head back to view the first virtual screen). As the vehicle completes the turn, the user device can bring the second virtual screen into a position that corresponds to the direction of travel.

Additionally, or alternatively, the visual transition can include concurrently displaying the first virtual screen and the second virtual screen during an overlap time period. For example, as the autonomous vehicle is approaching the turn from the first street to the second street, the user may maintain a constant field of view (e.g., by continuing to look straight toward the front of the vehicle). The user device can begin transitioning from the first virtual screen to the second virtual screen by sliding the first virtual screen to the left (out of the field of view of the user) and begin to slide the second virtual screen to the left (into the field of view of the user) such that at least a portion of the first virtual screen can be concurrently displayed with at least a portion of the second virtual screen. The timing for displaying and/or positioning of the second virtual screen can be proportional to the motion of the autonomous vehicle (e.g., proportional to the pace at which the autonomous vehicle completes the turn).

Additionally, or alternatively, the visual transition can include a fade transition from the first location to the second location. By way of example, the user device can fade-out the virtual content at the first location within the virtual environment (e.g., depicted in the first virtual screen) and/or fade-in the virtual content at the second location within the virtual environment (e.g., depicted in the second virtual screen). This can be particularly helpful in the event that the user is interacting with virtual content that includes a user interface (e.g., creating a document via a word processing interface).

The user device can also render, within the virtual environment, a visual representation of the vehicle's planned motion. For instance, the user device can provide for display a visual representation of the planned motion of the autonomous vehicle within the virtual environment. By way of example, the user device can render a path (e.g., a carpet, road, walkway, etc.) that extends under the video, user interface, and/or other rendered source content. The path can represent the planned vehicle route and/or planned motion trajectory of the autonomous vehicle. In some implementations, the path can change texture to indicate expected terrain (e.g., bumps, potholes, cobblestones, etc.) and/or render actual ground surface images. In some implementations, the path can include textual indicators that indicate future vehicle motion (e.g., a message stating "road curve ahead," etc.). Additionally, or alternatively, icons such as, for example, road signs can be rendered to indicative planned vehicle motion. The visual representation of the planned motion trajectory can be included in a virtual screen and/or within the virtual environment, outside of a virtual screen.

The user device can also present virtual content associated with objects within the interior of the autonomous vehicle. Such objects can include other users, items (e.g., bags, laptop, etc.), and/or portions of the user (e.g., hands, legs, etc.). For instance, one or more vehicle sensors located within the interior of the autonomous vehicle can detect and track one or more objects within the interior of the autonomous vehicle. For example, these vehicle sensor(s) can obtain data indicative of the position of an object within the interior of the autonomous vehicle. The vehicle sensor(s) can also track the position of the user device (e.g., virtual reality headset on the user's head) via the use of passive fiducials and/or active emitters (e.g., light emitting diodes, etc.). Additionally, or alternatively, a sensor (e.g., a camera) on the user device can be used to track passive fiducials and or active emitters in the vehicle interior. The user device can obtain the data indicative of the position of the object and the data indicative of the user device motion from the autonomous vehicle computing system. A user device sensor (e.g., a camera on the front of the virtual reality headset) can then be used to fill in imagery of the object from the user's current perceptive by warping the most recent imagery of the object to the user's predicted viewing position at the time the virtual content depicting the object will be displayed to the user. The motion of the user device (e.g., of the virtual reality headset) can be used to correct motion blur from the user device during the capture of the image by, for example, de-convolving the image with the associated motion kernel. The user device can display (e.g., via the display device(s), etc.) a visual representation of the item in the virtual environment for the user.

By way of example, the user's laptop and the position of the user device (e.g., a user's virtual reality headset) can be identified and tracked by vehicle sensor(s) in the interior of the autonomous vehicle. Data indicative of the position of the laptop can be provided to the user device. A sensor of the user device (e.g., a camera) can then be used to capture images containing the laptop. The user device can crop the portion corresponding to the laptop using the laptop coordinates. The user device can provide data indicative of a visual representation of the laptop for display (e.g., via a display device) in the virtual environment after correcting for the motion of the user device between image capture and display time, as well as the positional offset between the sensor and the user's eyes. The visual representation can include, for example, real imagery associated with the item and/or other representations (e.g., a cartoon version of a laptop). A similar such approach can be used for rendering another user (e.g., a co-passenger) in the virtual environment and/or a portion of the user (e.g., the user's hands) in the virtual environment.

While the present disclosure is described with reference to an autonomous vehicle, the systems and methods of the present disclosure can be applied to semi- and/or non-autonomous vehicles. For example, a user riding in the back of such a vehicle (e.g., that includes a human driver) may utilize a user device, as described herein. In such implementations, the user device can provide virtual content (e.g., via a virtual screen) that includes a visual representation of one or more of the vehicle's route segments (e.g., as determined based on GPS technology). While this approach may be less granular than using the planned motion trajectory of an autonomous motion planning system, it may still provide the user with a general understanding of the vehicle's expected motion in accordance with the vehicle route.

The systems and methods described herein provide a number of technical effects and benefits. For instance, the present disclosure provides improved systems and methods for presenting virtual content to a user within a vehicle. For instance, by presenting virtual content in accordance with the planned vehicle motion (e.g., planned direction of travel, in accordance with route segments, etc.), the user can remain oriented as the vehicle travels along a particular portion of a vehicle route. Additionally, by transitioning the user between locations within the virtual environment (e.g., via different virtual screens) for each vehicle route segment, the systems and methods can cause the user's vestibular system to adjust in accordance with vehicle motion. This can lead to decreased motion sickness as well as an improved user experience.

The systems and methods of the present disclosure also provide an improvement to computing technology, such as user device computing technology (e.g., virtual reality computing technology). For instance, the systems and methods enable a user device to efficiently render virtual content in a manner that is consistent with the motion of a vehicle. In particular, a computing system (e.g., a user device) can obtain data indicative of virtual content. The computing system can obtain data indicative of a planned motion of an autonomous vehicle. The computing system can determine a location for the virtual content within a virtual environment based at least in part on the data indicative of the planned motion of the autonomous vehicle. The computing system can provide for display, via one or more display devices, the virtual content at the location within the virtual environment. By rendering virtual content based on the planned vehicle motion (e.g., per vehicle route segment, via the virtual screens, etc.), the user device can minimize the number of transitions needed between virtual content (e.g., between virtual screens). This can help orient the user in the direction of the vehicle motion, while minimizing the transitions to discrete periods along a route (e.g., during segment changes). This can improve the approach taken by the user device to render virtual content within a vehicle.

With reference now to the FIGS., example embodiments of the present disclosure will be discussed in further detail. FIG. 1 illustrates an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104 (and/or a user device 110). The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as providing data to and/or receiving data from the vehicle 104, for managing a fleet of vehicles (that includes the vehicle 104), etc.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human operator (e.g., driver). In some implementations, a human operator can be omitted from the vehicle 104 (and/or also omitted from remote control of the vehicle 104). In some implementations, a human operator can be included in the vehicle 104. As described herein, in some implementations, the vehicle 104 can be a non-autonomous vehicle.

In some implementations, the vehicle 104 can be configured to operate in a plurality of operating modes. The vehicle 104 can be configured to operate in a fully autonomous (e.g., self-driving) operating mode in which the vehicle 104 is controllable without user input (e.g., can drive and navigate with no input from a human operator present in the vehicle 104 and/or remote from the vehicle 104). The vehicle 104 can operate in a semi-autonomous operating mode in which the vehicle 104 can operate with some input from a human operator present in the vehicle 104 (and/or remote from the vehicle 104). The vehicle 104 can enter into a manual operating mode in which the vehicle 104 is fully controllable by a human operator (e.g., human driver, pilot, etc.) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the human operator of the vehicle 104.

The operating modes of the vehicle 104 can be stored in a memory onboard the vehicle 104. For example, the operating modes can be defined by an operating mode data structure (e.g., rule, list, table, etc.) that indicates one or more operating parameters for the vehicle 104, while in the particular operating mode. For example, an operating mode data structure can indicate that the vehicle 104 is to autonomously plan its motion when in the fully autonomous operating mode. The vehicle computing system 102 can access the memory when implementing an operating mode.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send data to the vehicle 104 instructing the vehicle 104 to enter into, exit from, maintain, etc. an operating mode. By way of example, the operations computing system 106 can send data to the vehicle 104 instructing the vehicle 104 to enter into the fully autonomous operating mode. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 104 (e.g., its computing system, one or more processors, etc.) to perform operations and functions, such as those described herein for autonomously navigating the vehicle 104 through a surrounding environment, presenting virtual content, and/or other operations.

The vehicle 104 can include a communications system 108 configured to allow the vehicle computing system 102 (and its computing device(s)) to communicate with other computing devices. The vehicle computing system 102 can use the communications system 108 to communicate with the operations computing system 106, a user device 110, and/or one or more other computing device(s) over one or more networks (e.g., via one or more wireless signal connections). In some implementations, the communications system 108 can allow communication among one or more of the system(s) on-board the vehicle 104. The communications system 108 can include any suitable components for interfacing with one or more network(s), including, for example, transmitters, receivers, ports, controllers, antennas, and/or other suitable components that can help facilitate communication.

As shown in FIG. 1, the vehicle 104 can include one or more vehicle sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 112 can be configured to acquire vehicle sensor data 118 associated with one or more objects that are within the surrounding environment of the vehicle 104 (e.g., within a field of view of one or more of the vehicle sensor(s) 112). The vehicle sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The vehicle sensor data 118 can include image data, radar data, LIDAR data, and/or other data acquired by the vehicle sensor(s) 112. The object(s) can include, for example, pedestrians, vehicles, bicycles, and/or other objects. The object(s) can be located in front of, to the rear of, to the side of the vehicle 104, etc. The vehicle sensor data 118 can be indicative of locations associated with the object(s) within the surrounding environment of the vehicle 104 at one or more times. The vehicle sensor(s) 112 can provide the vehicle sensor data 118 to the autonomy computing system 114.

In addition to the vehicle sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the vehicle sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the vehicle sensor data 118 from the vehicle sensor(s) 112, attempt to comprehend the surrounding environment by performing various processing techniques on the vehicle sensor data 118 (and/or other data), and generate an appropriate motion plan through such surrounding environment. The autonomy computing system 114 can control the one or more vehicle control systems 116 to operate the vehicle 104 according to the motion plan.

The vehicle computing system 102 (e.g., the autonomy system 114) can identify one or more objects that are proximate to the vehicle 104 based at least in part on the vehicle sensor data 118 and/or the map data 120. For example, the vehicle computing system 102 (e.g., the perception system 124) can process the vehicle sensor data 118, the map data 120, etc. to obtain perception data 130. The vehicle computing system 102 can obtain perception data 130 that is indicative of one or more states (e.g., current and/or past state(s)) of one or more objects that are within a surrounding environment of the vehicle 104. For example, the perception data 130 for each object can describe (e.g., for a given time, time period) an estimate of the object's: current and/or past location (also referred to as position); current and/or past speed/velocity; current and/or past acceleration;

current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 124 can provide the perception data 130 to the prediction system 126.

The prediction system 126 can be configured to predict a motion of the object(s) within the surrounding environment of the vehicle 104. For instance, the prediction system 126 can create prediction data 132 associated with such object(s). The prediction data 132 can be indicative of one or more predicted future locations of each respective object. The prediction data 132 can indicate a predicted path associated with each object, if any. The predicted path can be indicative of a predicted object motion trajectory along which the respective object is predicted to travel over time. The prediction data 132 can be indicative of the speed at which the object is predicted to travel along the predicted path and/or a timing associated therewith. The prediction data 132 can be created iteratively at a plurality of time steps such that the predicted movement of the objects can be updated, adjusted, confirmed, etc. over time. The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization planner that includes an optimization algorithm, which considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). A motion plan 134 can include a planned motion trajectory 136 of the vehicle 104. The planned motion trajectory can be indicative of a trajectory that the vehicle 104 is to follow for a particular time period. The motion plan 134 can also indicate speed(s), acceleration(s), and/or other operating parameters/actions of the vehicle 104.

The motion planning system 128 can be configured to continuously update the vehicle's motion plan 128 and the corresponding planned motion trajectory 136. For example, in some implementations, the motion planning system 128 can generate new motion plan(s) 134 for the vehicle 104 (e.g., multiple times per second). Each new motion plan can describe motion of the vehicle 104 over the next several seconds (e.g., 5 seconds). Moreover, a new motion plan may include a new planned motion trajectory. Thus, in some implementations, the motion planning system 128 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 104.

The motion planning system 128 can provide the selected motion plan 134 with data indicative of the vehicle actions, a planned motion trajectory 136, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134. This can allow the vehicle control system(s) 116 to control the motion of the vehicle 104 in accordance with planned motion trajectory.

The vehicle computing system 102 can control the motion of the vehicle 104 to travel in accordance with a vehicle route. For instance, the vehicle computing system 102 can obtain data indicative of a vehicle route along which the vehicle 104 is to travel (e.g., to arrive at a destination). The vehicle route can include a plurality of route segments. Each route segment can be indicative of a distinct portion of the vehicle route. For example, a route segment can be associated with a portion of the vehicle route that travels straight along a first street in a northward direction and another route segment can be associated with another portion of the vehicle route that travels along a second street in an eastward direction. In some implementations, the vehicle route segments can be based on turn-by-turn directions.

In some implementations, the vehicle route (and the plurality of route segments) can be determined onboard the vehicle 104. For instance, the vehicle computing system 102 can determine a vehicle route based on an origin (e.g., a current location of the vehicle 104, a user pick-up location, etc.) and/or a destination (e.g., a user-requested destination). Additionally, or alternatively, the vehicle computing system 102 can determine the vehicle route based at least in part on the map data 120. In some implementations, the vehicle computing system 102 can segment the vehicle route into one or a plurality of vehicle route segments.

In some implementations, a vehicle route can be determined off-board the vehicle 104 (e.g., at a remote location). For example, an entity (e.g., service provider, owner, manager, etc.) can use one or more vehicles (e.g., autonomous vehicles) to provide a vehicle service such as a transportation service (e.g., rideshare service), a courier service, a delivery service, etc. The entity can be associated with the operations computing system 106. A user 138 can make a request for a vehicle service via the operations computing system 106. For instance, the user 138 can create a service request for a vehicle service via a user device. The user device can provide data indicative of a service request to the operations computing system 106. In some implementations, the service request can be generated based at least in part on user input to a user interface (e.g., associated with a software application). The service request can indicate the type of vehicle service that the user 138 desires (e.g., a transportation service, a delivery service, a courier service, etc.), an initial location associated with the user 138 (e.g., a current location of the user, a different location, etc.), a destination location, user preferences/settings, and/or other information. The operations computing system 106 can select the vehicle 104 to provide the requested vehicle service. The operations computing system 106 can determine a vehicle route for the vehicle 104 to arrive at the location of the user and/or a vehicle route for the vehicle 104 to travel from the location of the user to a desired destination. In some implementations, the operations computing system 106 can segment the vehicle route into one or a plurality of route segments. The operations computing system 106 can provide data indicative of the vehicle route to the vehicle computing system 102. The vehicle computing system 102 can obtain the data indicative of the vehicle route from the operations computing system 106 (e.g., via one or more wireless networks).

Figure 2:
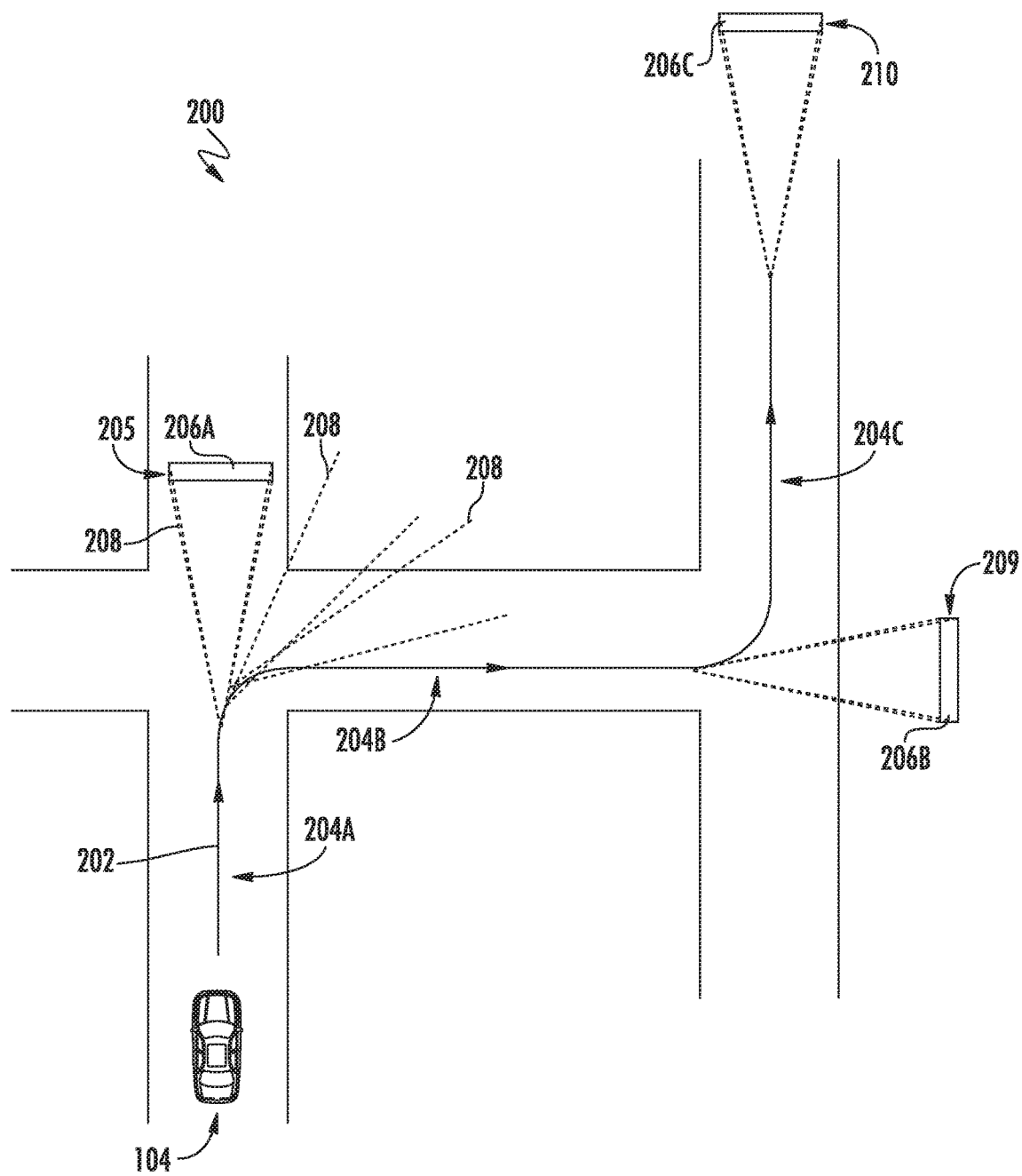
FIG. 2 illustrates a diagram of an example vehicle route according to example embodiments of the present disclosure.

FIG. 2 depicts illustrates a diagram 200 of an example vehicle route 202 according to example embodiments of the present disclosure. The user device 110 can obtain data indicative of a vehicle route 202 of the vehicle 104. The user device 110 can obtain data indicative of the vehicle route 202 via the vehicle computing system 102 of the vehicle 104 and/or another computing system (e.g., the operations computing system 106). Such data can be updated in real-time (and/or at least near-real-time) as the vehicle 104 travels and/or as the vehicle route is updated. The vehicle route 202 can include a plurality of route segments 204A-C (e.g., portions of the vehicle route 202). For instance, the vehicle route 202 can include a first route segment 204A during which the vehicle 104 is to travel straight along a first street (e.g., in a northward direction). The vehicle route 202 can include a second route segment 204B during which the vehicle 104 is to travel along a second street (e.g., in an eastward direction). The vehicle route 202 can include a third route segment 204C during which the vehicle 104 is to travel along a third street (e.g., in a northward direction).

Returning to FIG. 1, as a user 138 rides in the vehicle 104, the user 138 can utilize a user device 110. The user device 110 can be a computing system that includes one or more computing devices. The computing device(s) can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the user device 110 (e.g., its computing system, one or more processors, etc.) to perform operations and functions, such as those described herein for presenting virtual content.

The user device 110 can be or otherwise include various types of user devices. For instance, the user device 110 can be and/or include a phone, a tablet, personal digital assistant, computerized eyewear, computerized headwear, other types of wearable and/or handhold-able computing devices, a gaming system, a media player, an e-book reader, and/or other types of user devices. In some implementations, the user device 110 can be associated with a user 138. The user device 110 can be associated with a vehicle 104, as further described herein. The user device 110 can include a virtual/augmented reality display system such as, for example, a head-mounted display unit that is worn by the user 138 who is located within an interior of the vehicle 104 (e.g., for entertainment, communication, touring, gaming, news, advertising, enhanced views of area around user, etc.). The user device 110 can include one or more display devices 140 (e.g., display screens, etc.) that are configured to display virtual content for the user 138, as further described herein.

In some implementations, the user device 110 can be permanently located within the vehicle 104. For instance, the user device 110 can be a virtual/augmented reality headset that remains in the vehicle 104 for use by multiple, different users. The user device 110 can be in wired and/or wireless connection with the vehicle 104.

In some implementations, the user device 110 can be temporarily located within the vehicle 104. For instance, the user device 110 can be associated with the user 138. By way of example, the user device 110 can be a display system that includes a mobile phone of the user 138 that can be coupled to a head-mount device to present virtual content to the user 138 and/or other head-mounted display systems that can present virtual content to a user 138. The user device 110 can include a software application (e.g., downloaded to a local memory) that can be launched when a user 138 desires to view virtual content (e.g., when the user 138 is in the interior of the vehicle, etc.). For example, the user device 110 can connect to a network of the vehicle 104 when within the vehicle 104 (e.g., a Wi-Fi network associated with the vehicle 104, etc.). The user device 110 can launch the software application (e.g., in response to user input, automatically upon entry to vehicle, etc.) in the event the user 138 desires to view virtual content while riding in the vehicle 104. Such a software application can be the same as or different from a software application via which the user 138 may request a vehicle service.

The user device 110 can be configured to create a virtual environment for the user 138. For example, the user device 110 can create a virtual environment that the user 138 can view via the one or more display devices 140. In some implementations, the virtual environment can be a virtual reality environment. For example, the user device 138 can create a virtual movie theater such that it appears as if the user 138 is located in a movie theater, rather than the vehicle 104. In some implementations, the virtual environment can be an augmented reality environment. By way of example, the user device 110 can obtain vehicle sensor data 118 indicative of video from sensors (e.g., cameras) mounted on top of the vehicle 104 and, combined with three-dimensional volumetric data, render video of the surrounding environment of the vehicle with modified or additional content overlays. In another example, the user device 110 can provide unaltered views from these cameras as real-time video to the display devices 140. In some implementations, additional augmented content can be overlaid on features (e.g., buildings, points of interest) or overlaid on the vehicle 104. The virtual environment can also, or alternatively, include a depiction of a portion of the interior of the vehicle 104 (e.g., as if the user was sitting in the back seat, sitting in the front seat, without a vehicle floor, without a vehicle roof, etc.). In some implementations, portions of the virtual environment can be stylized to match a theme or narrative and/or they can be stylized in conjunction with user preferences (e.g., saved in database accessible via the software application).

The user device 110 can obtain data indicative of virtual content 142. For instance, user device can obtain data indicative of virtual content 142 from a local accessible memory. The user device 110 can generate virtual content 142 that can be rendered via one or more display devices (e.g., display screens) of the user device 110. The user device 110 can obtain data indicative of source content 144 to be rendered as virtual content 142. The source content 144 can include two-dimensional visual content that can be rendered as virtual content 142 (e.g., two-dimensional virtual content). For example, the source content 144 can include videos, user interfaces, web browsers, games, etc. The user device 110 can generate the virtual content 142 based at least in part on the source content 144 (e.g., a rendering of the two-dimensional visual content).

The user device 110 can obtain the data indicative of the source content 144 via one or more sources. In some implementations, the user device 110 can obtain the data indicative of the source content 144 from one or more local accessible memories of the user device 110 and/or one or more memories that are remote from the user device 110

(e.g., accessible via the software application). Such memories may include a user device content library that includes videos, documents, images, and/or other visual content. The user device 110 can obtain the source content 144 from one or more of these memories and render the virtual content 142, accordingly. Additionally, or alternatively, the source content 144 can include data acquired via one or more user device sensors 146 of the user device 110. For example, the user device 110 can include one or more user device sensors 146 (e.g., cameras) configured to acquire user device sensor data (e.g., image data associated with surrounding environment of the user 138). The user device 110 can render the virtual content 142 based on the user device sensor data.

In some implementations, the user device 110 can obtain the data indicative of the source content 144 from the vehicle 104 (e.g., the vehicle computing system 102). For example, the user device 138 can obtain source content 144 that is stored onboard the vehicle 104, for example, in a content library 148 cached locally on the vehicle 104. In another example, the source content 144 can include data acquired by the vehicle 104 via the vehicle sensor(s) 112 (e.g., LIDAR, RADAR, cameras, etc.). For example, the source content 144 can include the vehicle sensor data 118 (and/or a processed version thereof). The user device 110 can obtain the vehicle sensor data 118 and render virtual content 142 within the virtual environment accordingly.

In some implementations, the user device 110 can obtain the data indicative of the source content 144 from another user device. For instance, the user device 110 can obtain data indicative of the source content 144 from another user device located within the vehicle 104. By way of example, the user 138 may have a laptop, tablet, and/or other user device within the interior of the vehicle 104. The user device 110 can obtain data indicative of the source content 144 (e.g., a user interface) from the other user device (e.g., a laptop). The user device 110 can render the source content 144 as virtual content 142, as further described herein.

The user device 110 can also obtain data indicative of a planned motion of the vehicle 104. The data indicative of the planned motion can include data indicative of a vehicle route 202 of the vehicle 104 and/or a planned motion trajectory 136 of the vehicle 104. The vehicle computing system 102 can provide the data indicative of the vehicle route 202 and/or planned motion trajectory 136 (e.g., as determined by the vehicle's motion planning system 128) to the user device 110 (e.g., via a wired and/or wireless network). The user device 110 can obtain the data indicative of the vehicle route 202 and/or planned motion trajectory 136 as the vehicle 104 autonomously navigates through its surroundings. As described herein, the planned vehicle motion trajectory 136 can be indicative of a current motion trajectory of the vehicle 104 and a future motion trajectory of the vehicle 104. Moreover, the data indicative of the planned motion of the vehicle 104 can be updated in real-time and/or at least near-real-time (e.g., accounting for any transmission, processing, and/or other delays) as the vehicle route 202 changes and/or the motion planning system 128 iteratively determines the trajectory of the vehicle 104.

The user device 110 can determine a location for the virtual content 142 within a virtual environment based at least in part on the data indicative of the planned motion of the vehicle 104. For instance, the user device 110 can process the data indicative of the planned motion to determine one or more vehicle parameters. The vehicle parameter(s) can be indicative of the various types of information associated with the current and/or future motion of the vehicle. For example, the vehicle parameter(s) can be indicative of a current and/or future: vehicle heading, locations/orientations of vehicle route segment(s), length of route segment(s), vehicle position along the vehicle route and/or route segment(s), vehicle speed/velocity, vehicle action(s) (e.g., merge, lane change, pull-over, etc.), and/or other parameters. The user device 110 can determine a location of the virtual content 142 within the virtual environment based at least in part on the vehicle parameter(s).

The location can be chosen in a manner that helps reduce the motion sickness of the user 138 viewing the virtual content 142. For instance, the location of the virtual content 142 within the virtual environment can be based at least in part on the heading of the vehicle 104. By way of example, with reference to FIG. 2, the vehicle 104 can travel in a northward direction along the first route segment 204A. The user device 110 can determine a first location 205 for the virtual content 142 within a virtual environment based at least in part on the data indicative of the planned motion of the vehicle 104. The first location 205 can be associated with a first route segment 204A of a vehicle route 202 of the vehicle 104. For instance, the user device 110 can determine that the virtual content 142 should be at a first location 205 within the virtual environment as the vehicle 104 travels along the first route segment 204A. In this way, the virtual content 142 can be positioned in the direction of the vehicle's motion as it travels along the first route segment 204A so that the user 138 looks in the same direction that the vehicle 104 is moving in order to view the virtual content 142. Moreover, the virtual content 142 can be located at an appropriate viewing angle (e.g., 20-40 degrees, user-adjusted, etc.) and an appropriate viewing range (e.g., infinite viewing range). The virtual content 142 can be fixed/stationary with respect to the exterior surrounding environment of the vehicle 104.

The user device 110 can provide for display (e.g., via the one or more display devices 140) the virtual content 142 at the determined location within the virtual environment. For instance, the user device 110 can provide for display (e.g., via the one or more display devices 140) the virtual content 142 at the first location 205 within the virtual environment. The virtual content 142 can be displayed at the first location 205 as the vehicle 104 travels along the first route segment 204A.

The virtual content 142 can be displayed within a virtual screen. A virtual screen can be a finite space within the virtual environment that depicts rendered virtual content. By way of example, a virtual screen can depict a two-dimensional video for the user 138 and/or a game for the user 138 while riding in the vehicle 104. Additionally, or alternatively, the virtual screen can depict a user interface by which the user 138 can enter text (e.g., a word processing user interface), create a document (e.g., build a presentation slide deck), browse the internet (e.g., a web browser), and/or perform other activities. A virtual screen can be associated with the determined location for the virtual content 142 within the virtual environment. For example, a first virtual screen 206A can be positioned at the first location 205 for the virtual content 142 within the virtual environment. The virtual content 142 can be displayed within the first virtual screen 206A at the first location 205 within the virtual environment.

A virtual screen can be associated with a route segment of the vehicle route 202. The user device 110 can obtain data indicative of a vehicle route 202 of the vehicle 104 (e.g., from the vehicle's computing system 102). As described herein, the vehicle route 202 can include a plurality of route segments 204A-C. The user device 110 can generate a virtual screen 206A-C for one or more of (or each) route segment 204A-C of the vehicle route 202 based at least in part on the data indicative of the vehicle route 202.

Figure 3:
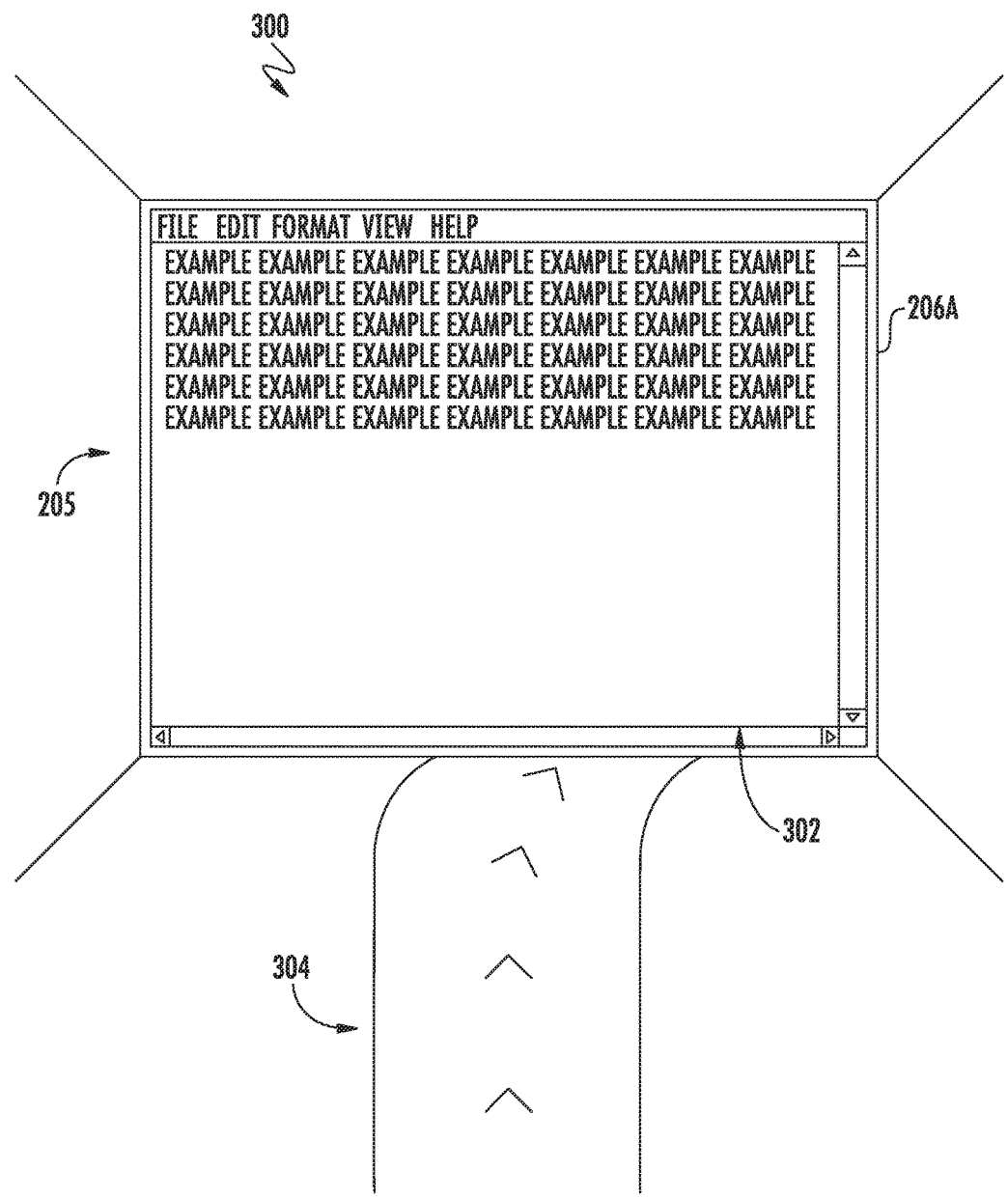
FIG. 3 illustrates example virtual content at a first location according to example embodiments of the present disclosure.

By way of example, FIG. 3 illustrates example virtual content 302 according to example embodiments of the present disclosure. The virtual content 302 can be included in a virtual environment 300 (e.g., a virtual reality environment, an augmented reality environment, etc.). The virtual content 302 can be at least a portion of the virtual content 142. The virtual content 302 can include virtual content generated from the source content 144. As shown in FIG. 3, this can include, for example, a two-dimensional user interface (e.g., a word processor interface). A virtual screen can be associated with a determined location for the virtual content 142 based at least in part on the planned motion of the vehicle 104. The virtual content 142 can be located at the first location 205 within the virtual environment 300. As described herein, the first location 205 can be associated with a first route segment 204A and/or the vehicle parameters of the vehicle 104 (e.g., as it travels along the first route segment 204A). At least a portion of the virtual content 302 can be included in the first virtual screen 206A at the first location 205 within the virtual environment 300 (e.g., as the vehicle 104 travels along the first route segment 204A).

As similarly described herein, the user device 110 can position the virtual screen(s) 206A-C within the virtual environment 300 (e.g., at the determined location(s), etc.) in a manner that helps reduce user motion sickness. For instance, the virtual screen(s) 206A-C can be positioned at an appropriate viewing angle (e.g., 20-40 degrees, user-adjusted, etc.) and an appropriate viewing range (e.g., infinite viewing range). Moreover, the virtual screen(s) 206A-C can be fixed/stationary with respect to the exterior surrounding environment of the vehicle 104 (e.g., on the horizon), as opposed to being stationary with respect to the interior of the vehicle 104. This allows a virtual screen to correspond to the motion of the vehicle 104 with respect to the outside world.

The position of a virtual screen 206A-C within the virtual environment 300 (e.g., at the determined location(s), etc.) can also be based at least in part on the heading of the vehicle 104. For example, the user device 110 can obtain data indicative of the heading of the vehicle 104 (e.g., from inertial sensors of the user device 110, from the vehicle computing system 102, etc.). The user device 110 can position a virtual screen (e.g., first virtual screen 206A) within the virtual environment 300 (e.g., at the first location 205) based at least in part on the heading of the vehicle 104. For instance, the first virtual screen 206A can be positioned in the direction of the vehicle's motion as it travels along the first route segment 204A so that a field of view 208 the user 138 (e.g., within the virtual environment) is in the same direction that the vehicle 104 is moving in order for the user 138 view the virtual content 142 on the first virtual screen 206A.

By way of example, the user 138 may desire to utilize a laptop while riding in the vehicle 104 (e.g., for a transportation service). The laptop may include a screen-sharing software application that enables the laptop to provide data indicative of a video, user interface, and/or other source content to the user device 110. The user device 110 (e.g., the software application downloaded thereto) can render the video, user interface, and/or other source content as virtual content 142 on the first virtual screen 206A in front of the user 138 in the direction of the vehicle's travel and at infinite viewing range that is stationary in world coordinates.

The user device 110 can determine additional locations for the virtual content 142 within the virtual environment 300. This can occur as the vehicle 104 is traveling. For instance, the user device 110 can determine a second location 209 for the virtual content 142 within the virtual environment 300 based at least in part on the data indicative of the planned motion of the vehicle 104. The second location 209 can be associated with a second route segment 204B of the vehicle route 202 of the vehicle 104. By way of example, while the vehicle 104 travels along the first route segment 204A, the user device 110 can determine that the vehicle 104 is going to begin traveling along the second route segment 204B (e.g., in a few seconds) based at least in part on the vehicle route 202 and/or the planned motion trajectory 136. The vehicle 104 may, for example, plan a right turn action such that the vehicle 104 will adjust from traveling along a first street (e.g., in the northward direction) to traveling along a second street (e.g., in the eastward direction). The heading of the vehicle 104 along the second route segment 204B (e.g., the second street) may be ninety degrees to the right of the first route segment 204A (e.g., the first street). Accordingly, the user device 110 can determine that the second location 209 of the virtual content 142 within the virtual environment 300 should be at a position ninety degrees to the right of the first location 205. In some implementations, the user 138 may adjust his/her field of view 208 (e.g., by turning the user's head and head mounted user device) ninety degrees to the right in order to view the virtual content 142 at the second location 209 within the virtual environment 300. In some implementations, in the event that the user 138 maintains the same field of view in the virtual environment 300 as the vehicle 104 turns (e.g., the user 138 maintains a head position that faces straight toward the front of the vehicle), the virtual content 142 at the second location 209 can slide into the user's field of view 208, as the vehicle 104 turns onto the second route segment 204B. The virtual content 142 at the second location 209 can be fixed/stationary with respect to the exterior surrounding environment of the vehicle 104.

The user device 110 can provide for display (e.g., via the one or more display devices 140) the virtual content 142 at the second location 209 within the virtual environment 300. For instance, the virtual content 142 can be displayed within a second virtual screen 206B at the second location 209 (e.g., at least as the vehicle 104 travels along the second route segment 206B). The user device 110 can generate a second virtual screen 206B for the second route segment 204B of the plurality of route segments 204A-C of the vehicle route 202 (e.g., during which the vehicle 104 is to travel along a second street in an eastward direction). The second virtual screen 206B can depict the at least a portion of virtual content 142 rendered by the user device 110 (e.g., a video, user interface). Moreover, the second virtual screen 206B can be positioned in accordance with the second route segment 204B (e.g., ninety degrees to the right of the first route segment).

Figure 4:
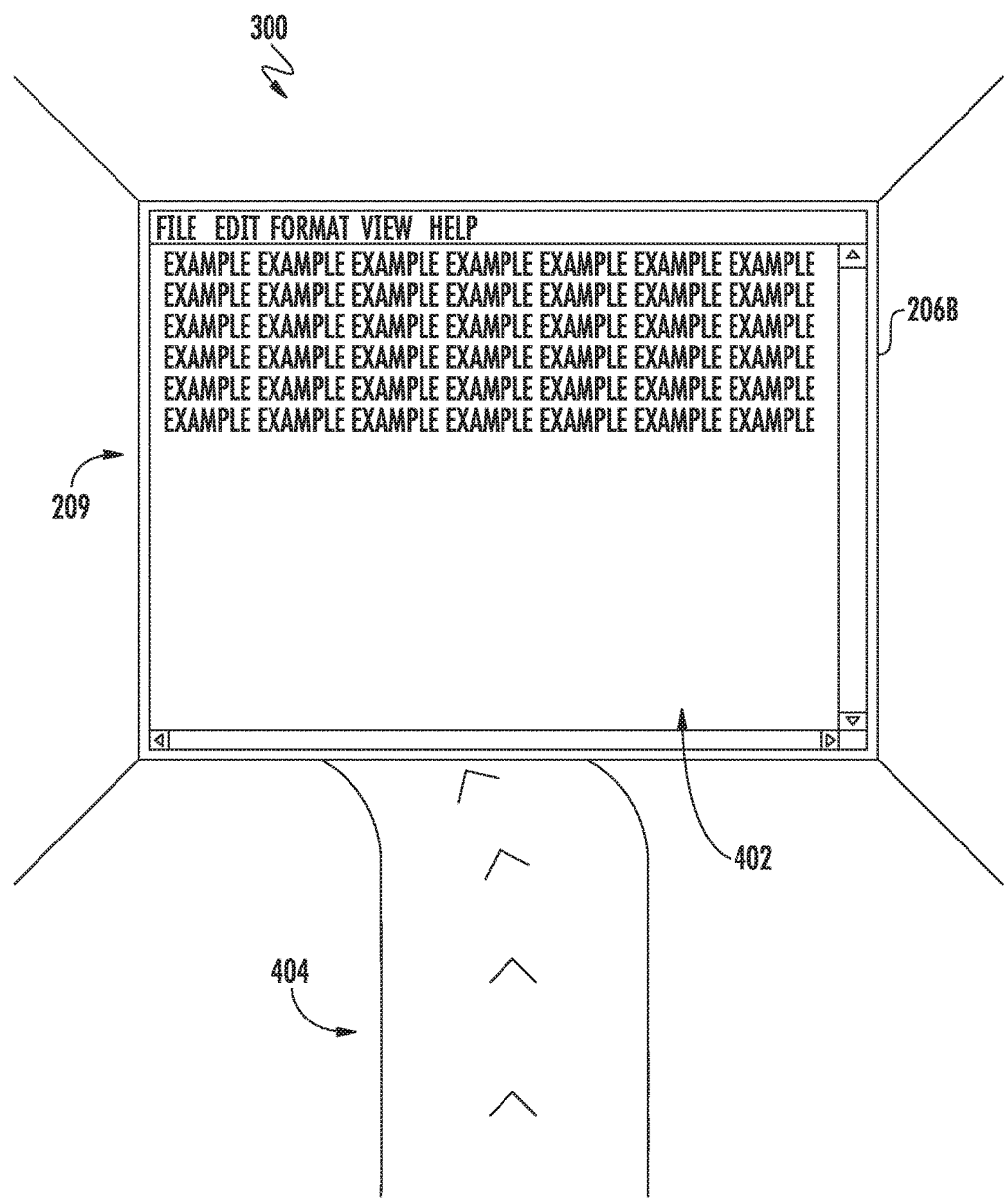
FIG. 4 illustrates example virtual content at another location according to example embodiments of the present disclosure.

By way of example, FIG. 4 illustrates the second virtual screen 206B within the virtual environment 300 according to example embodiments of the present disclosure. The second virtual screen 206B can depict at least a portion of virtual content 402. The virtual content 402 can be the same as or different from virtual content 142, 302. For example, as shown in FIG. 4, the second virtual screen 206B can display a user interface similar to that depicted in the first virtual screen 206A. The second virtual screen 206B can be provided for display (e.g., via the one or more display devices 140) before, while, and/or after the vehicle 104 travels along the second route segment.

Returning to FIG. 2, the second virtual screen 206B can be positioned in accordance with the second route segment 204B. For example, the heading of the vehicle 104 along the second route segment 204B may be ninety degrees to the right, clockwise, etc. of the vehicle's heading during the first route segment 204A. Accordingly, the user device 110 can provide for display (e.g., via display device(s)) the second virtual screen 206B within the virtual environment 300 at a position ninety degrees to the right of the first virtual screen 206A, as shown in FIG. 2 for example. The second virtual screen 206B can be fixed/stationary within the virtual environment 300 with respect to the world outside of the vehicle 104 (e.g., the vehicle's exterior surrounding environment).

The user device 110 can provide a visual transition between the virtual content 142 at the first location 205 (e.g., the first virtual screen 206A) to the virtual content 142 at the second location 209 (e.g., the second virtual screen 206B), as the vehicle 104 travels in accordance with the vehicle route 202. A visual transition can lead the user 138 to transition from viewing one virtual content 142 at one location to another. In some implementations, this can include discrete visual transitions that indicate to the user 138 that there is an upcoming change in vehicle motion (e.g., from a first route segment 204A to a second route segment 204B). The visual transitions can prime the user 138 to handle the future motion of the vehicle 104 (e.g., by tensing muscles as appropriate) and further reduce motion sickness.

For example, while the vehicle 104 travels along the first route segment 204A, the user device 110 can determine that the vehicle 104 is going to begin traveling along the second route segment 204B (e.g., in a few seconds) based at least in part on the data indicative of the vehicle route 202 and/or the data indicative of the planned motion trajectory 136. The vehicle 104 may, for example, plan a right turn action such that the vehicle 104 is to adjust from traveling along a first street (e.g., in the northward direction) to traveling along a second street (e.g., in the eastward direction). The user device 110 can provide for display within the virtual environment 300 (e.g., via the one or more display devices 140) a visual transition from the virtual content 142 at the first location 205 (e.g., the first virtual screen 206A) to the virtual content 142 at the second location 209 (e.g., the second virtual screen 206B). The visual transition can cause the user 138 to adjust the user's field of view 208 (and/or expect to adjust the field of view) from the first location 205 (e.g., the first virtual screen 206A) to the second location 209 (e.g., the second virtual screen 206B) and, thus, subconsciously orient the user 138 (e.g., the user's vestibular system) in accordance with the motion of the vehicle 104.

Figure 5:
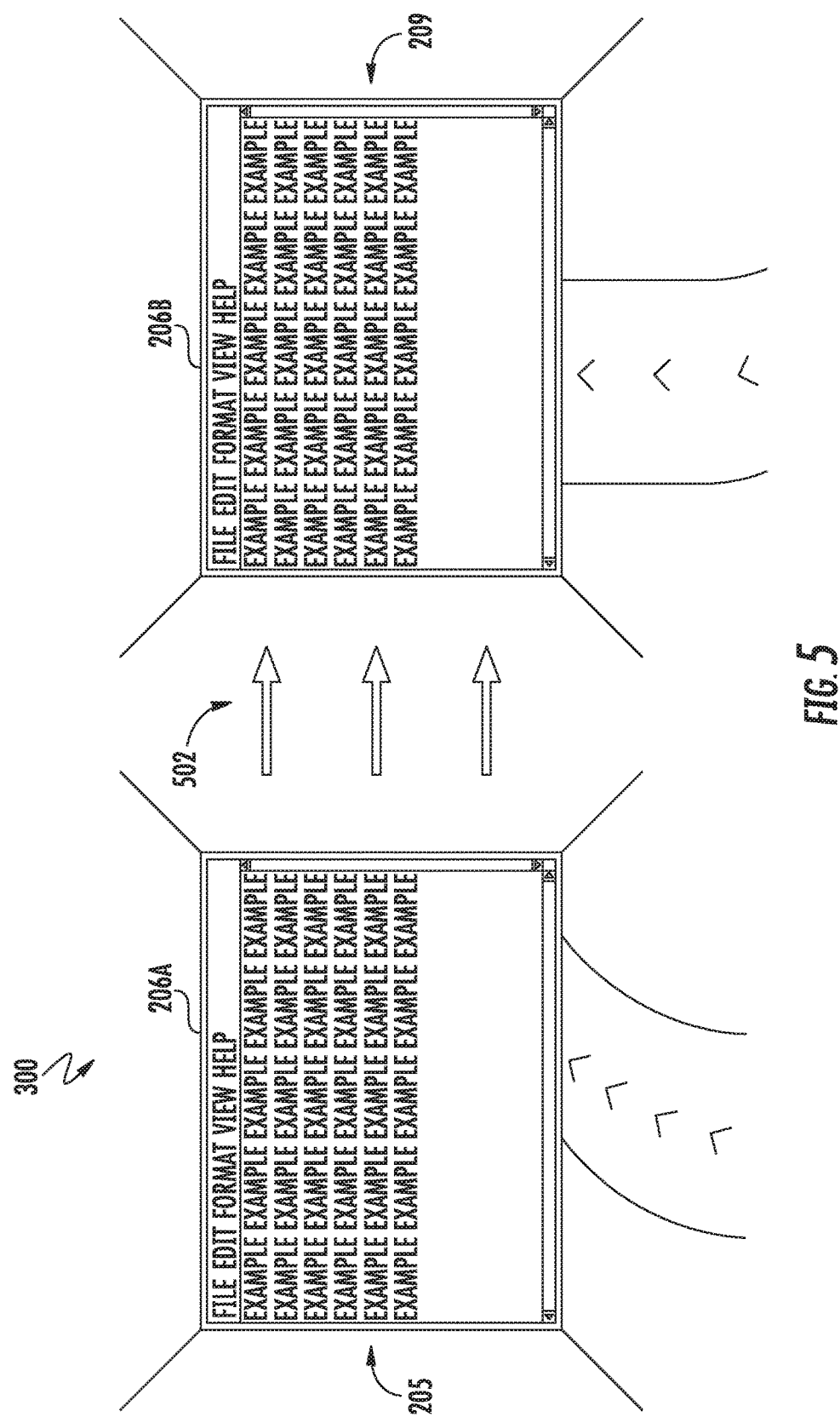
FIG. 5 illustrates an example transition from the example location of FIG. 3 to the example location of FIG. 4 according to example embodiments of the present disclosure.

The visual transition can be presented in a variety of manners. In some implementations, the user device 110 can provide for display (e.g., via the display device(s) 140) one or more indicators (e.g., arrows, text, symbols, etc.) within the virtual environment 300. The indicator(s) can direct the user 138 to adjust the position of the user's head, eyes, field of view 208, etc. in accordance with the motion of the vehicle 104 (e.g., the upcoming motion of the vehicle 104). The user device 110 can determine the one or more indicators based at least in part on the data indicative of the planned motion of the vehicle 104 (e.g., based at least in part on the motion plan 134, the planned vehicle route 202, the planned motion trajectory 136, etc.). The one or more indicators can be indicative of a presence of the virtual content 142 at the second location 209 and/or the second virtual screen 206B within the virtual environment 300. As shown in FIG. 5, the one or more indicators 502 can be included within the virtual environment 300 to inform the user 138, for example, that the virtual content 142 is available for viewing within the virtual environment 300 at the second location 209 (e.g., in the second virtual screen 206B).

The indicator(s) 502 can be rendered in the virtual environment 300 when the vehicle 104 is located at a certain point along a route segment, is within a certain range along a route segment, at a certain distance to the next route segment and/or a transition to another route segment, at a certain time, within a certain time period, and/or other trigger points/periods. By way of example, as the vehicle 104 is approaching the right turn from the first route segment 204A to the second route segment 204B (e.g., is within 5 seconds of starting the turn, is within 500 ft. of the turn, etc.), the user device 110 can provide for display the indicator(s) 502 within the virtual environment 300 perceived by the user 138. The indicator(s) 502 can be displayed within a current field of view of the user 138. The indicator(s) 502 can inform and/or instruct the user 138 to look and/or turn his/her head to the right, that there is virtual content 142 to the right, that there is a second virtual screen 206B to the right, etc. Accordingly, the user 138 can begin to view the virtual content 142 at the second location 209 (e.g., the second virtual screen 206B that corresponds to the second vehicle route segment 204B).

In some implementations, the transition can be based at least in part on the position of the user device 110. For example, one or more vehicle sensors within the interior of the vehicle 104 and/or inertial sensors of the user device 110 can track the motion of the user device 110 (e.g., a head-mounted display unit worn on the user's head). The user device 110 can obtain data indicative of a position of the user device 110 (e.g., via such sensor(s)). The visual transition from the virtual content 142 at the first location 205 (e.g., via the first virtual screen 206A) to the virtual content 142 at the second location 209 (e.g., via the second virtual screen 206B) can be based at least in part on the position of the user device 110. For example, as the user device 110 (e.g., and/or the user's field of view 208) turns to the right, the virtual content 142 (and, in some implementations, the second virtual screen 206B) can begin to display within the virtual environment 300 at the second location 209. In some implementations, once the user 138 (e.g., and/or the user's field of view 208) completely turns away from the first location 205 (e.g., the first virtual screen 206A), the user device 110 can remove the virtual content 142 at the first location 205 (e.g., the first virtual screen 206A) from the virtual environment 300 (e.g., such that the user 138 can no longer view the virtual content 142 at the first location 205 and/or the first virtual screen 206A).

Additionally, or alternatively, the visual transition can include concurrently displaying the virtual content 142 at the first location 205 (e.g., the first virtual screen 206A) and the virtual content 142 at the second location 209 (e.g., the second virtual screen 206B). This can occur, for instance, during an overlapping time period. For example, as the vehicle 104 is approaching a transition (e.g., turn, merge, etc.) from the first route segment 204A to the second route segment 204B, the user device 110 may stay at a constant position (e.g., by the user 138 continuing to look straight toward the front of the vehicle 104). The user device 110 can begin transitioning from the virtual content 142 at the first location 205 (e.g., the first virtual screen 206A) to virtual content 142 at the second location 209 (e.g., the second virtual screen 206B). This can occur, for instance, by sliding the first virtual screen 206A out of the field of view 208 of the user 138 (e.g., to the left) and sliding the second virtual screen 206B into the field of view 208 of the user 138 (e.g., to the left). In such implementations, the user device 110 can concurrently provide for display within the virtual environment 300 (e.g., via the display device(s) 140), at least a portion of the first virtual screen 206A and at least a portion of the second virtual screen 206B (e.g., within a field of view 208 within the virtual environment 300). The timing for displaying and/or positioning of the second virtual screen 206B can be proportional to the motion of the vehicle 104 (e.g., proportional to the pace at which the autonomous vehicle completes the turn).

Additionally, or alternatively, the visual transition can include a fade transition from the virtual content 142 at the first location 205 (e.g., the first virtual screen 206A) to the virtual content 142 at the second location 209 (e.g., the second virtual screen 206B). By way of example, the user device 110 can fade-out the virtual content 142 at the first location 205 (e.g., included in the first virtual screen 206A) within the virtual environment 300 (e.g., and/or within the user's field of view 208) and/or fade-in the virtual content 142 at the second location 209 (e.g., the second virtual screen 206B) within the virtual environment 300 (e.g., and/or within the user's field of view 208).

In some implementations, the virtual content 142 (e.g., a virtual screen) may not be displayed at a certain location until the vehicle 104 is located at a certain trigger point and/or at a certain time. For example, in some implementations, the virtual content 142 at the second location 209 (e.g., the second virtual screen 206B) may not be provided for display in the virtual environment 300 until the vehicle 104 is located at a certain point along the first route segment 204A, is within a certain range of locations along a first route segment 204A, at a certain distance to the second route segment 204B and/or a transition to the second route segment 204B (e.g., distance from the turn), at a certain time, within a certain time period, and/or other trigger points/periods. In another example, in some implementations, the virtual content 142 may not be provided for display in the virtual environment 300 at a third location 210 (e.g., via a third virtual screen 206C) until the vehicle 104 is located at a certain point along the second route segment 204B, is within a certain range of locations along a second route segment 204B, at a certain distance to the third route segment 204C and/or a transition to the third route segment 204C (e.g., distance from a turn on a third street), at a certain time, within a certain time period, and/or other trigger points/periods.

The user device 110 can also render, within the virtual environment 300, a visual representation of the vehicle's planned motion. For instance, the user device 110 can determine the visual representation based at least in part on the data indicative of the planned motion of the vehicle 104 (e.g., the vehicle route 202, the motion plan 134, the planned motion trajectory 136, etc.). The user device 110 can provide for display a visual representation of the planned motion of the vehicle 104 within the virtual environment 304.

By way of example, with reference to FIG. 3, the user device 110 can provide for display (e.g., via the display device(s) 140) a visual representation 304 of at least a portion of the planned motion trajectory 136 of the vehicle 104, within the virtual environment 300. The visual representation 304 can be generated as virtual content within the virtual environment and updated as the vehicle 104 travels, plans motion, adjusts the vehicle route, etc. The visual representation 304 can include the portion of the planned motion trajectory 136 of the vehicle 104 that corresponds to a route segment currently being traversed by the vehicle 104 (e.g., first route segment 204A) and/or a route segment to be traversed by the vehicle 104 (e.g., second route segment 204B). The visual representation 304 can be displayed concurrently, adjacent too, nearby, etc. with the virtual content 302 at the first location 205 (e.g., the first virtual screen 206A). The visual representation 304 can include, for example, a path (e.g., a carpet, road, walkway, etc.) that extends under the video, user interface, and/or another portion of the virtual content 142. In another example, the virtual environment 300 can make it appear as if there is no floor of the vehicle 104 and the path can extend under the user's feet. The visual representation 304 (e.g., the path) can represent the planned motion trajectory 136 and/or vehicle route 202 of the vehicle 104 (e.g., along the first route segment 204A of the vehicle route 202). In some implementations, the visual representation 304 can change texture to indicate expected terrain (e.g., bumps, potholes, cobblestones, etc.) and/or include actual ground surface images. In some implementations, the visual representation 304 can include textual indicators that indicate future vehicle motion (e.g., a message stating "road curve ahead," etc.). In some implementations, the visual representation 304 of the planned motion trajectory 136 can be within the virtual environment 300 and entirely outside of a virtual screen. In some implementations, a virtual screen (e.g., the first virtual screen 206A) can depict at least a portion of the visual representation 304 of at least the portion of the planned motion trajectory 136 of the vehicle (e.g., included in the virtual content 302). In some implementations, a portion of the visual representation 304 can be included in the virtual screen and a portion of the visual representation 304 can be outside of the virtual screen.

In another example, with reference to FIG. 4, the user device 100 can provide for display (e.g., via the display device(s) 140), a visual representation 404 of at least a portion of the planned motion trajectory 136 of the vehicle 104 concurrently, adjacent too, nearby, etc. with the virtual content 402 at the second location 209 (e.g., the second virtual screen 206B). This can include the portion of the planned motion trajectory 136 of the vehicle 104 that corresponds to the first route segment 204A, the second route segment 204B, and/or a route segment to be traversed by the vehicle 104 (e.g., third route segment 204C). In some implementations, at least a portion of the visual representation 404 of the planned motion trajectory 136 can be included in the second virtual screen 206B. In some implementations, the visual representation 404 of the planned motion trajectory 136 can be within the virtual environment 300 but entirely outside of the second virtual screen 206B. In some implementations, a portion of the visual representation 404 can be included in the virtual screen 206B and a portion of the visual representation 404 can be outside of the virtual screen 206B.

The user device 110 can also present virtual content associated with objects within the interior of the vehicle 104. Such objects can include other users, items (e.g., bags, laptop, etc.), and/or portions of the user (e.g., hands, legs, etc.). The user device 110 can obtain data indicative of an object within the interior of the vehicle 104. The user device can identify an object within the interior of the vehicle 104 based on such data. The user device can provide for display (e.g., via the display device(s) 140) a visual representation of the object within the virtual environment 300.

For instance, one or more vehicle sensors (e.g., cameras) located within the interior of the vehicle 104 can detect and track one or more objects within the interior of the vehicle 104. For example, these vehicle sensor(s) can obtain data indicative of the position of an object within the interior of the vehicle 104. The position of the object can be defined relative to the interior of the vehicle 104 (e.g., coordinates associated therewith). One or more vehicle sensors (e.g., within the interior of the vehicle 104) can also track the position of the user device 110 (e.g., headset on the user's head) via the use of passive fiducials and/or active emitters (e.g., light emitting diodes, etc.). The user device 110 can obtain the data indicative of the position of the object and the data indicative of the motion of the user device 110 from the vehicle computing system 102. One or more of the user device sensors 146 (e.g., a camera on the front of the user device) can then be used to fill in imagery of the object from the user's current perceptive by warping the most recent imagery of the object to the user's predicted viewing position at the time virtual content 142 depicting the object will be provided for display to the user 138. The motion of the user device 110 can be used to correct motion blur from the user device 110 during the capture of the image by, for example, de-convolving the image with the associated motion kernel. The user device 110 can provide for display (e.g., via the display device(s), etc.) a visual representation of the object in the virtual environment 300, such that the user 138 can view the object within the virtual environment 300.

Figure 6:
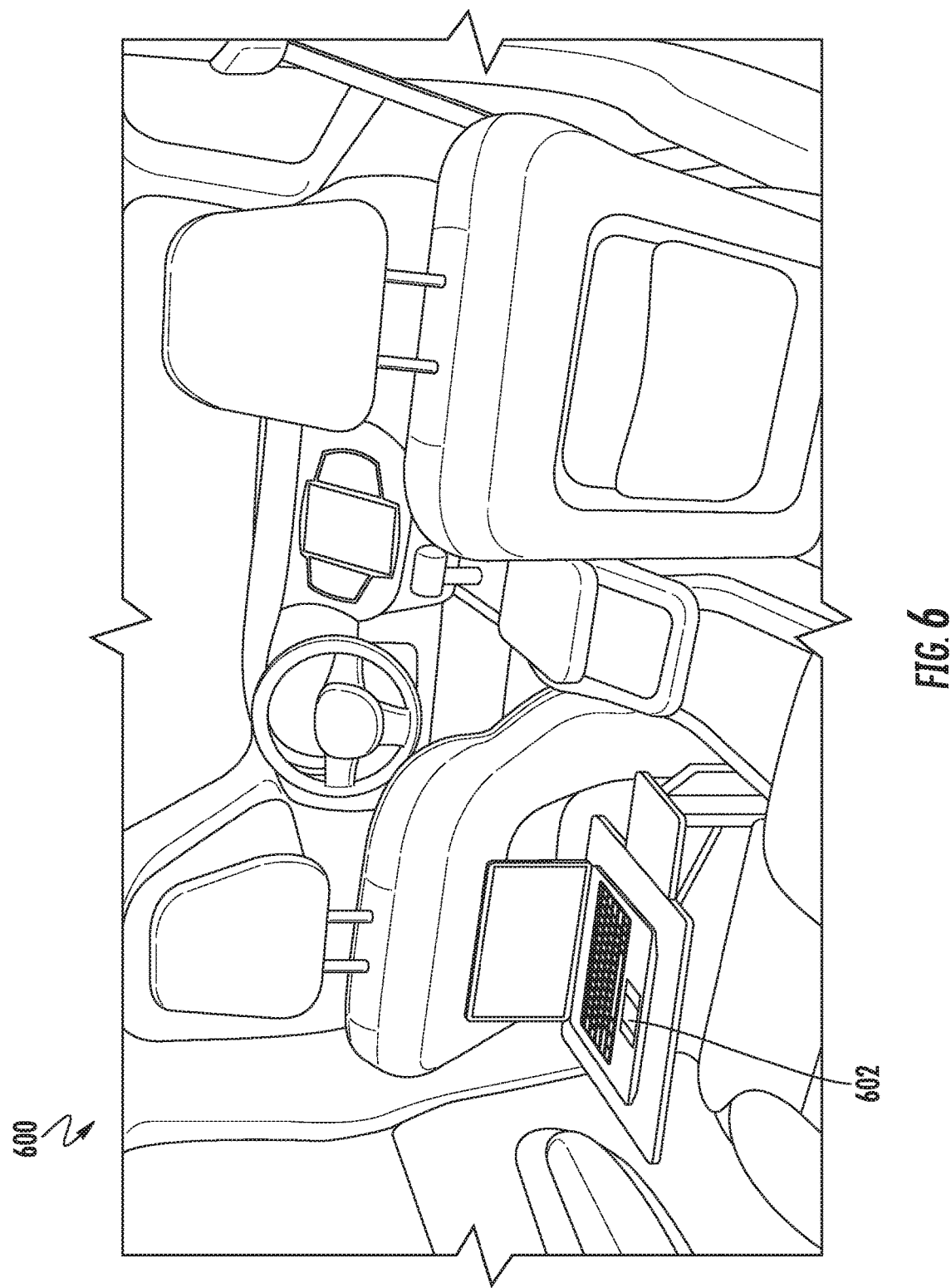
FIG. 6 illustrates example vehicle interior including according to example embodiments of the present disclosure.

By way of example, FIG. 6 illustrates an example vehicle interior 600 according to example embodiments of the present disclosure. The user 138 can be located within the interior 600 of the vehicle 104. An object 602 (e.g., of the user 138) can be located within the interior 600 of the vehicle 104. The object 602 (e.g., a laptop) and the position of the user device 110 can be identified and tracked by one or more vehicle sensor(s) in the interior of the vehicle 104. The vehicle computing system 102 can provide data indicative of the position of the object 602 to the user device 110. At least one sensor 146 of the user device 110 (e.g., a camera) can be used to capture image data associated with the object 602 (e.g., images containing the object 602). The user device can crop the portion corresponding to the object 602 using the coordinates of the object 602 (e.g., to create a masking). The user device 110 can provide for display (e.g., via the display device(s) 140) a visual representation of the object 602 in the virtual environment 300 after correcting for the motion of the user device 110 between image data capture and display time, as well as the positional offset between the user device sensor and the user's eyes. The visual representation can include, for example, real imagery associated with the object (e.g., a real image of the laptop, etc.) and/or other representations (e.g., a cartoon version of a laptop, etc.). A similar such approach can be used for rendering another user (e.g., a co-passenger) in the virtual environment 300 and/or a portion of the user 138 (e.g., the user's hands) in the virtual environment 300.

In some implementations, the user device 110 can render complementary virtual content that is associated with the source content 144. By way of example, the source content 142 can be indicative of a two-dimensional user interface. The user device 110 can obtain data indicative of such source content from another user device such as, for example, a laptop within the interior of the vehicle 104. To allow the user 138 to provide user input to the rendered user interface (e.g., to type textual content), the user device 110 can render complimentary virtual content within the virtual environment 300. This can include, for example, a virtual keyboard, virtual mouse, etc. displayed within the virtual environment 300 (e.g., with a corresponding surface in the vehicle interior so that the user's finger contact a physical object for an enhanced experience). The user 138 can provide user input to the virtual keyboard, virtual mouse, etc. in order to interact with the rendered user interface (e.g., to enter text in the word processing user interface).

In some implementations, the user device 110 can also present virtual content associated with objects within the exterior surrounding environment of the vehicle 104. Such objects can include other vehicles, pedestrians, bicyclists, etc. The user device 110 can obtain data indicative of an object within the exterior surrounding environment of the vehicle 104. The user device 110 can identify an object within the exterior surrounding environment of the vehicle 104 based on such data. The user device 110 can provide for display (e.g., via the display device(s) 140) a visual representation of the object within exterior surrounding environment of the vehicle 104.

For example, the vehicle 104 may be waiting (e.g., in a stopped position) as a pedestrian crosses in front of the vehicle 104. The sensors 112 of the vehicle 104 and/or the sensor(s) 146 of the user device 110 can acquire sensor data indicative of the pedestrian. The user device 110 can obtain data indicative of the pedestrian and render a visual representation of the pedestrian in the virtual environment. This can include for example, a cropped video feed of just that pedestrian crossing in front of the vehicle 104 in the virtual environment (e.g., using imagery from the vehicle sensors 112). In some implementations, the visual representation of the object can be positioned in the virtual environment so that other virtual content is not occluded. For example, the user's elevation in the virtual environment can be lowered or raised so that the user 138 can look straight ahead at a virtual screen and the pedestrian can be shown crossing below and in front of the virtual screen and does not occlude the content of interest to the user 138 (e.g., video, user interface, etc.). Showing this imagery can also allow the user 138 to predict when the vehicle 104 will start moving again. In another example, the user device 110 can render a visual representation (e.g., a video feed, icon, etc.) of a traffic light in the virtual environment (e.g., somewhere on the border of a virtual screen) to cue the user 138 about what is going on in the real world and what accelerations to expect.

While the present disclosure is described with reference to an autonomous vehicle, the systems and methods of the present disclosure can be applied to semi- and/or non-autonomous vehicles. In such implementations, virtual screens can be generated and utilized a similar manner to that described above. The visual representation of the vehicles future motion can, however, be based on vehicle route data (e.g., instead of a planned motion trajectory determined by a motion planning system of an autonomy system).

For example, as described herein the vehicle 104 can include a non-autonomous vehicle. A user 138 riding in the back of such a vehicle (e.g., that includes a human driver) may utilize a user device 110. The user device 138 can obtain data indicative of virtual content 142, as described herein. The user device 138 can obtain data indicative of a planned motion of the vehicle 104. This can include, for instance, data indicative of a vehicle route 202. The vehicle route 202 can include a plurality of route segments 204A-C. The user device 110 can determine a location for the virtual content 142 based at least in part on the data indicative of the planned motion of the vehicle 104 (e.g., the planned vehicle route). The user device 110 can provide for display (e.g., via one or more display devices 140), the virtual content 142 at the determined location within the virtual environment 300. For example, the user device 100 can determine the location for the virtual content 142 based at least in part on a heading of the vehicle 104 associated with a first route segment 204A of a vehicle route 202. The user device 110 generate a first virtual screen 206A associated with a first route segment 204A of the plurality of route segments 204A-C. The first virtual screen 206A can depict at least a portion of the virtual content 142 (e.g., the portion corresponding to the rendered source content 144). The user device 110 can provide for display within a virtual environment 300 (e.g., via the one or more display devices 140), the first virtual screen 206A associated at the determined location (e.g., first location 205) within the virtual environment 200 (e.g., at least as the vehicle 104 travels along the first route segment 204A) The user device 110 can also provide for display (e.g., via the display device(s) 140) a visual representation of at least a portion of the vehicle route 202 within the virtual environment 300. For example, the visual representation of the vehicle route 202 can be indicative of at least a portion of the first route segment 204A (e.g., on which the vehicle 104 is traveling) and/or at least a portion of the second route segment 204A (e.g., on which the vehicle 104 will be traveling).

In another example, a user device (e.g., a human operator's mobile phone) could be positioned within the vehicle 104 (e.g., mounted on the dash and/or windshield) such that a user device sensor (e.g., a camera of the mobile phone) has unobstructed field of view through the windshield of the vehicle 104. This user device can track the motion of the vehicle 104 (e.g., via image data, IMU, GPS, map data, etc.). The user device can predict what the human operator is doing and provide associated indications to another user of the vehicle (e.g., a passenger). For example, the user device can determine the planned motion of the vehicle and/or aspects of the vehicle's surrounding environment based at least in part on acquired sensor data (e.g., image data from a camera), map data (e.g., GPS positioning on a map), inertial sensor information, etc. The user device can provide for display (e.g., via a user interface of a display device) an image, icon, etc. of the planned motion and/or other aspects of the vehicle's surrounding environment. For example, the user device can provide an icon indicating that a traffic light is red if the vehicle 104 is stopped at a known traffic light and switching the icon to green once acceleration is detected (e.g., even if the actual traffic light is out of the field of view the user device sensor). Additionally, or alternatively, the user device can provide an visual representation of a pedestrian crossing in front of the vehicle 104 (e.g., an actual image, cartoon representation, etc.). If the other user device in the vehicle 104 (e.g., a passenger's virtual reality headset) has an outward facing sensor (e.g., camera), that other user device can be used to detect the position of the user device (e.g., mounted on the dash/windshield, etc.) relative to the passenger's user device and other stationary points in the interior of the vehicle 104. The position tracking of the user device (e.g., mounted on the dash/windshield, etc.) could then be used to stabilize the virtual screens with respect to the outside environment even if the user device (e.g., mounted on the dash/windshield, etc.) is not currently in the field of view of the other user device.

Figure 7:
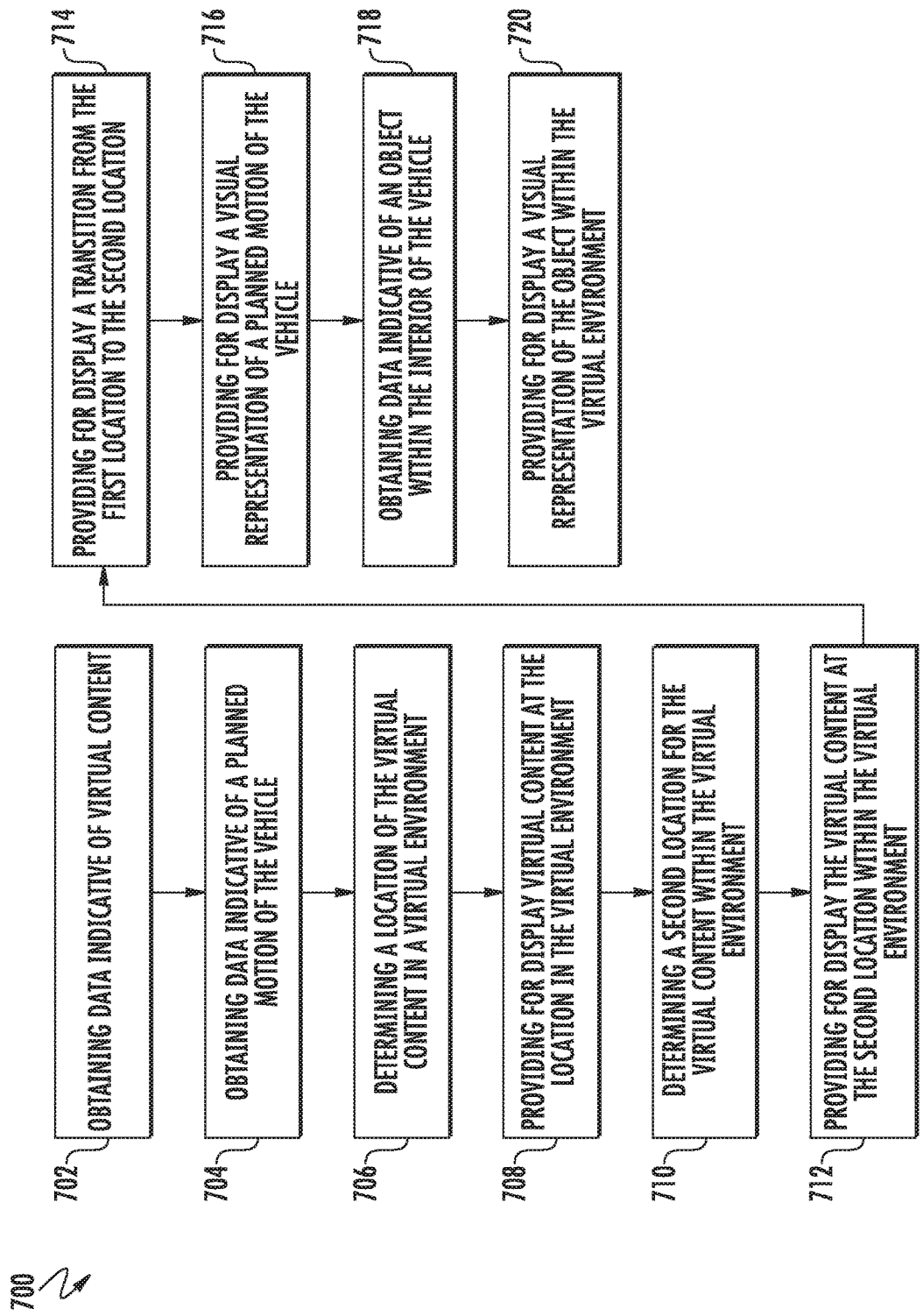
FIG. 7 illustrates a flow diagram of an example method for displaying virtual content according to example embodiments of the present disclosure.

FIG. 7 depicts a flow diagram of an example method 700 for presenting virtual content according to example embodiments of the present disclosure. One or more portion(s) of the method 700 can be implemented by one or more computing devices such as, for example, the one or more computing device(s) of the user device 110 and/or other systems (e.g., the vehicle computing system 102). Each respective portion of the method 700 can be performed by any (or any combination) of the one or more computing devices. Moreover, one or more portion(s) of the method 700 can be implemented as an algorithm on the hardware components of the device(s) described herein (e.g., as in FIGS. 1 and 8), for example, to present virtual content for a user of a vehicle. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include obtaining data indicative of virtual content. For instance, the user device 110 can obtain data indicative of virtual content 142. The user device 110 can obtain data indicative of source content 144. The source content 144 can be two-dimensional content that can be rendered as virtual content 142 in a virtual environment 300. The source content 144 can be obtained via a memory of the user device, the vehicle computing system 102, another user device, a cloud-based system, and/or other sources. The user device 110 can generate virtual content 142 based at least in part on the source content 144. The virtual content 142 can include rendered source content 142 (e.g., a rendered user interface). In some implementations, a representation of the planned motion trajectory 136 of the vehicle 104 can be rendered as virtual content, as further described herein.

At (704), the method 700 can include obtaining data indicative of a planned motion of the vehicle. For instance, the user device 110 can obtain data indicative of a planned motion of the vehicle 104. The data indicative of the planned motion of the vehicle 104 can include data indicative of a vehicle route 202 of the vehicle 104. The data indicative of the planned motion of the vehicle 104 can include data indicative of a planned motion trajectory of the vehicle 104. The data indicative of the planned motion of the vehicle 104 can also, or alternatively, include data indicative of a motion plan 134 and/or other data. The user device 110 can obtain the data indicative of the planned motion of the vehicle 104 from the vehicle computing system 102 and/or another computing system (e.g., the operations computing system 106 via a software application on the user device).

At (706), the method 700 can include determining a location of virtual content in a virtual environment. For instance, the user device 110 can determine a location for the virtual content 142 within a virtual environment 300 based at least in part on the data indicative of the planned motion of the vehicle 104. For example, the user device 110 can determine a first location 205 for the virtual content 142 within the virtual environment 300 based at least in part on the planned motion of the vehicle 104. In some implementations, the user device 110 can determine one or more vehicle parameters based at least in part on the data indicative of a planned motion of the vehicle 104. The one or more vehicle parameters can include, for example, a heading of the vehicle 104. The user device 110 can determine the location for the virtual content 142 (e.g., the first location 205) within the virtual environment 300 based at least in part on the one or more vehicle parameters. The determined location (e.g., the first location 205) can be associated with a first route segment 204A of the vehicle route 202, as described herein.

At (708), the method 700 can include providing for display virtual content at the location in the virtual environment. The user device 110 can provide for display, via one or more display devices 140, the virtual content 142 at the location within the virtual environment 300 (e.g., at the first location 205 within the virtual environment 300). For example, the virtual content 142 can be displayed within a first virtual screen 206A at the first location 205 within the virtual environment 300. The first virtual screen 206A can be associated with the first route segment 204A of the vehicle route 202 (e.g., that includes a plurality of route segments 206A-C), as described herein.

For instance, the user device 110 can generate a first virtual screen 206A associated with a first route segment 204A of the plurality of route segments 204A-C. The first virtual screen 206A depicts at least a portion of the virtual content 142. For instance, the source content 144 can include two-dimensional visual content, as described herein. At least the portion of the first virtual content 142 depicted in the first virtual screen 206A can include a rendering of the two-dimensional visual content. By way of example, the data indicative of the source content 144 can be associated with a user interface. The first virtual content 142 can include a rendering of the user interface. The first virtual screen can depict the rendering of the user interface (e.g., as in FIG. 3). The first virtual screen 206A can be stationary with respect to an exterior surrounding environment of the vehicle 104.

At (710), the method 700 can include determining a second location for the virtual content within the virtual environment. The user device 110 can determine a second location 209 for the virtual content 142 within the virtual environment 300 based at least in part on the data indicative of the planned motion of the vehicle 104. The second location 209 can be associated with a second route segment 204B of the vehicle route 202.

At (712), the method 700 can include displaying the virtual content at the second location within the virtual environment. For instance, the user device 110 can provide for display, via the one or more display devices 140, the virtual content 142 at the second location 209 within the virtual environment 300. The virtual content 142 can be displayed within a second virtual screen 206B at the second location 209 within the virtual environment 300. The second virtual screen 206B can be associated with the second route segment 204B of the vehicle route 202.

For instance, the user device 110 can generate a second virtual screen 206B associated with a second route segment 204B of the plurality of route segments 204A-C. The user device 110 can provide within the virtual environment 300, via the one or more display devices 140, the second virtual screen 206B associated with the second route segment 204B (e.g., as the vehicle 104 travels along the second route segment 204B). The second virtual screen 206B can depict at least a portion of the virtual content 142 (e.g., a rendering of the source content 144).

At (714), the method 700 can include providing for display a transition from the first location to the second location. For instance, the user device 100 can provide for display within the virtual environment 300 (e.g., via the one or more display devices 140) a visual transition from the virtual content 142 at the first location 205 to the virtual content 142 at the second location 209. By way of example, the user device 110 can provide for display within the virtual environment 300 (e.g., via the one or more display devices 140), one or more indicators 520 (e.g., as virtual content) that are indicative of a transition of the virtual content 142 at the first location 205 within the virtual environment 300 to the second location 209 within the virtual environment 300.

In some implementations, the user device 110 can provide for display within the virtual environment 300 (e.g., via the one or more display devices 140), a transition from the first virtual screen 206A to the second virtual screen 206B (e.g., at least as the vehicle 104 travels from the first route segment 204A onto the second route segment 204B). In some implementations, the user device 110 can concurrently provide for display within the virtual environment 300, via the one or more display devices 140, at least a portion of the first virtual screen 206A and at least a portion of the second virtual screen 206B. In some implementations, the user device 110 can provide for display within the virtual environment 300, via the one or more display devices 140, a fading transition from the first virtual screen 206A to the second virtual screen 206B. In some implementations, the user device 110 can determine one or more indicators 502 based at least in part on the data indicative of the planned motion trajectory 136 of the vehicle 104. The one or more indicators 502 can be indicative of the presence of the second virtual screen 206B within the virtual environment 300. In some implementations, transition from the first virtual screen 206A to the second virtual screen 206B can be based at least in part on the position of the user device 110 (e.g., the head-mounted display unit).

At (716), the method 700 can include providing for display a visual representation of the planned motion of the vehicle within the virtual environment. For instance, the user device 110 can provide for display within the virtual environment 300, via the one or more display devices 140, a visual representation 304, 404 of the planned motion trajectory 136 of the vehicle 104. In some implementations, the visual representation 304, 404 can be indicative of the planned vehicle route 202 of the vehicle 104. The visual representation of the planned motion of the vehicle 104 can be rendered as virtual content.

At (718), the method 700 can include obtaining data indicative of an object within the interior of the vehicle. For instance, the user device 100 can obtain data indicative of an object 602 within the interior 600 of the vehicle 104. The user device 110 can provide for display, via the one or more display devices 140, a visual representation of the object 602 within the virtual environment 300, at (720). The visual representation of the object 602 can be rendered as virtual content. In some implementations, the user device 110 can provide for display within the virtual environment 300 (e.g., via the display devices 140) complimentary virtual content associated with the object 602, as described herein. This can provide the user 138 with situational awareness/comfort as to the location and safety of the user's belongings and/or other users.

Figure 8:
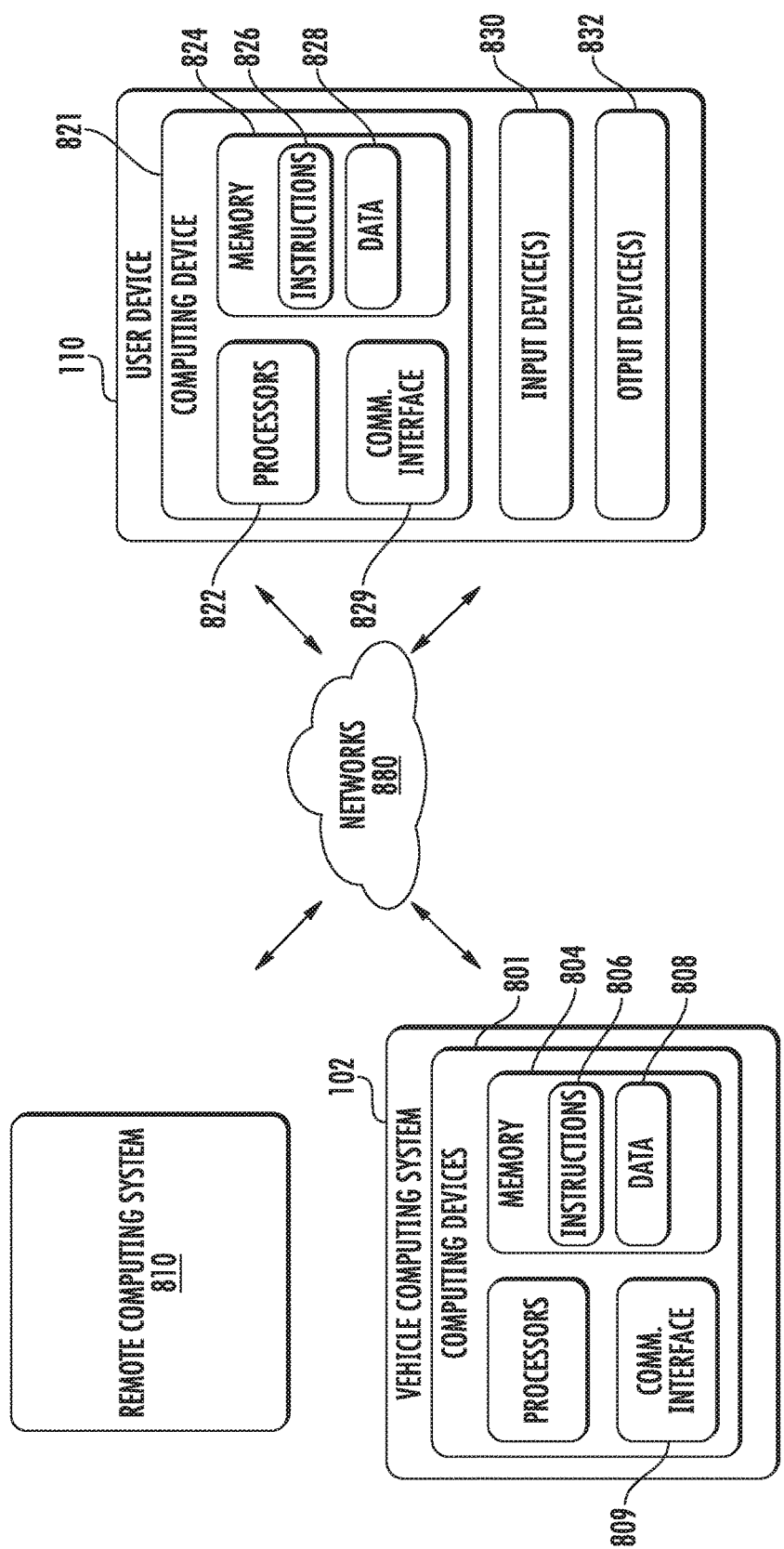
FIG. 8 illustrates example system components according to example embodiments of the present disclosure.

FIG. 8 depicts example system components of an example system 800 according to example embodiments of the present disclosure. The example system 800 can include the vehicle computing system 102, a remote computing system 810, and the user device 110. One or more of these computing systems can be communicatively coupled to one another over one or more network(s) 880.

The vehicle computing system 102 can include one or more computing device(s) 801. The computing device(s) 801 of the vehicle computing system 102 can include processor(s) 802 and a memory 804 (e.g., onboard the vehicle 104). The one or more processors 802 can be any suitable processing device (e.g., a processor core, a microprocessor, an ASIC, a FPGA, a controller, a microcontroller, graphics processing unit, specialized processor for virtual content, etc.) and can be one processor or a plurality of processors that are operatively connected. The memory 804 can include one or more non-transitory computer-readable storage media, such as RAM, ROM, EEPROM, EPROM, one or more memory devices, flash memory devices, etc., and combinations thereof.

The memory 804 can store information that can be accessed by the one or more processors 802. For instance, the memory 804 (e.g., one or more non-transitory computer-readable storage mediums, memory devices) can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 can store instructions 806 that when executed by the one or more processors 802 cause the one or more processors 802 (the computing system 102) to perform operations such as any of the operations and functions of the vehicle computing system 102, the vehicle 104, or for which the vehicle computing system 102 is configured, as described herein, the operations for presenting virtual content (e.g., one or more portions of method 700), and/or any other operations and functions for the vehicle computing system 102, as described herein.

The memory 804 can store data 808 that can be obtained, received, accessed, written, manipulated, created, and/or stored. The data 808 can include, for instance, sensor data, perception data, prediction data, data indicative of planned motion of a vehicle (e.g., motion planning data, data indicative of planned motion trajectories, data indicative of vehicle route(s), etc.), data indicative of source content, data indicative of virtual content, data indicative of virtual screens, data indicative of coordinate systems (e.g., of a virtual environment, exterior surrounding environment/outside world of the vehicle, vehicle interior, etc.), data associated with object(s) in the interior of the vehicle, map data, and/or other data/information described herein. In some implementations, the computing device(s) 801 can obtain data from one or more memories that are remote from the vehicle 104.

The computing device(s) 801 can also include a communication interface 809 used to communicate with one or more other system(s) on-board the vehicle 104 and/or a remote computing device that is remote from the vehicle 104 (e.g., the other systems of FIG. 8, etc.). The communication interface 809 can include any circuits, components, software, etc. for communicating via one or more networks (e.g., 880). In some implementations, the communication interface 809 can include, for example, one or more of a communications controller, receiver, transceiver, transmitter, port, conductors, software and/or hardware for communicating data/information.

The remote computing system 810 can include one or more remote computing devices that are remote from the vehicle computing system 102 and/or the user device 110. The remote computing devices can include components (e.g., processor(s), memory, etc.) similar to that described herein for the computing device(s) 801. Moreover, the remote computing system 810 can be, include, and/or other be configured to perform one or more operations of the operations computing system 106, as described herein.

The user device 110 can be various types of user devices. For example, the user device 110 can include a phone, a tablet, a personal digital assistant (PDA), a personal computer, a computerized watch (e.g., a smart watch), computerized eyewear, computerized headwear, other types of wearable computing devices, a gaming system, a media player, an e-book reader, and/or other types of devices. The user device 110 can be associated with a user (e.g., 138). The user device 110 can be associated with a vehicle (e.g., 104).

The user device can be a computing system that is or includes one or more computing device(s) 821. The computing device(s) 821 of the user device 110 can include processor(s) 822 and a memory 824. The one or more processors 822 can be any suitable processing device (e.g., a processor core, a microprocessor, an ASIC, a FPGA, a controller, a microcontroller, graphics processing unit, specialized processor for virtual content, etc.) and can be one processor or a plurality of processors that are operatively connected. The memory 824 can include one or more non-transitory computer-readable storage media, such as RAM, ROM, EEPROM, EPROM, one or more memory devices, flash memory devices, etc., and combinations thereof.

The memory 824 can store information that can be accessed by the one or more processors 822. For instance, the memory 824 (e.g., one or more non-transitory computer-readable storage mediums, memory devices, etc.) can include computer-readable instructions 826 that can be executed by the one or more processors 802. The instructions 826 can be software written in any suitable programming language or can be implemented in hardware. Additionally, or alternatively, the instructions 826 can be executed in logically and/or virtually separate threads on processor(s) 822.

For example, the memory 824 can store instructions 826 that when executed by the one or more processors 822 cause the one or more processors 822 (the user device 110) to perform operations such as any of the operations and functions of the user device 110, or for which the user device 110 is configured, as described herein, the operations for presenting virtual content (e.g., one or more portions of method 700), and/or any other operations and functions for the user device 110, as described herein.

The memory 824 can store data 828 that can be obtained, received, accessed, written, manipulated, created, and/or stored. The data 828 can include, for instance, sensor data, data indicative of planned motion of a vehicle (e.g., motion planning data, data indicative of planned motion trajectories, data indicative of vehicle route(s), etc.), data indicative of source content, data indicative of virtual content, data indicative of virtual screens, data indicative of coordinate systems (e.g., of a virtual environment, exterior surrounding environment/outside world of the vehicle, vehicle interior, etc.), data associated with object(s) in the interior of the vehicle, and/or other data/information described herein. In some implementations, the computing device(s) 821 can obtain data from one or more memories that are remote from the vehicle 104.

The computing device(s) 821 can also include a communication interface 829 used to communicate with one or more other systems that are remote from the user device 110 (e.g., the other systems of FIG. 8, etc.). The communication interface 829 can include any circuits, components, software, etc. for communicating via one or more networks (e.g., 880). In some implementations, the communication interface 829 can include, for example, one or more of a communications controller, receiver, transceiver, transmitter, port, conductors, software and/or hardware for communicating data/information The user device 110 can also include one or more input device(s) 830 and/or one or more output device(s) 832. In the event that the user device 110 is associated with a vehicle, the input device(s) 830 and/or the output device(s) 832 can be included and/or otherwise associated with one or more human-machine interface system(s) of the vehicle. The input devices 830 can include, for example, hardware for receiving information from a user, such as a touch screen, touch pad, mouse, data entry keys, speakers, a microphone suitable for voice recognition, imaging devices and/or sensors for gesture recognition technology, etc. The output device(s) 832 can include one or more display device(s) (e.g., display screen, CRT, LCD, other devices for creating a virtual environment, etc.). In some implementations, the output device(s) 832 can include one or more audio output device(s) (e.g., speakers).

The network(s) 880 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 880 can be accomplished, for instance, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. For example, the vehicle 104 (e.g., the vehicle computing system 102) can include a virtual reality/augmented reality computing system (including one or more computing devices) that can perform any of the operations and/or functions of the user device 110, as described herein. The virtual reality/augmented reality computing system of the vehicle 104 can generation and provide (e.g., send, transmit, and/or otherwise make available) data indicative of the virtual content, virtual screens, virtual environment, etc. to the user device 110. The user device 110 can provide these for display via the one or more display devices 140 (e.g., for the user 138).

Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Computing tasks discussed herein as being performed at computing device(s) remote from the vehicle can instead be performed at the vehicle (e.g., via the vehicle computing system), or vice versa. For example, the vehicle (e.g., the vehicle computing system) can include a virtual reality/augmented reality computing system (including one or more computing devices) that can perform any of the operations and/or functions of the user device, as described herein. The virtual reality/augmented reality computing system of the vehicle can generate and provide (e.g., send, transmit, and/or otherwise make available) data indicative of the virtual content, virtual screens, virtual environment, etc. to the user device. The user device can provide these for display via the one or more display devices (e.g., for the user).

Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for presenting virtual content, comprising:

obtaining, by a computing system comprising one or more computing devices, data indicative of virtual content;

obtaining, by the computing system, data indicative of a planned motion of an autonomous vehicle, wherein the data indicative of the planned motion of the autonomous vehicle comprises data indicative of a vehicle route of the autonomous vehicle, wherein the vehicle route comprises a plurality of route segments comprising a first route segment and a second route segment that is different from the first route segment;

determining, by the computing system, a first location for the virtual content within a virtual environment based at least in part on the data indicative of the planned motion of the autonomous vehicle, wherein the first location is associated with the first route segment of the vehicle route;

providing for display, by the computing system via one or more display devices, the virtual content at the first location within the virtual environment, wherein the virtual content is displayed within a first virtual screen at the first location within the virtual environment;

determining, by the computing system, a second location for the virtual content within the virtual environment based at least in part on the data indicative of the planned motion of the autonomous vehicle, wherein the second location is associated with the second route segment of the vehicle route, wherein a direction of travel associated with the second route segment is different than a direction of travel associated with the first route segment;

providing for display, by the computing system via the one or more display devices, the virtual content at the second location within the virtual environment, wherein the virtual content is displayed within a second virtual screen at the second location within the virtual environment, wherein the second virtual screen and the first virtual screen are substantially similar in size, wherein at least a portion of the first virtual screen is concurrently displayed with at least a portion of the second virtual screen; and removing, by the computing system, the first virtual screen from the virtual environment.

2. The computer-implemented method of claim 1, further comprising:

providing for display within the virtual environment, by the computing system via the one or more display devices, one or more indicators that are indicative of a transition of the virtual content at the first location within the virtual environment to the second location within the virtual environment.

3. The computer-implemented method of claim 2, wherein the one or more indicators direct a user to the second location of the second virtual screen within the virtual environment.

4. The computer-implemented method of claim 1, further comprising:

providing for display within the virtual environment, by the computing system via the one or more display devices, a visual transition from the first virtual screen to the second virtual screen at least as the vehicle travels from the first route segment onto the second route segment.

5. The computer-implemented method of claim 1, wherein determining, by the computing system, the first location for the virtual content within the virtual environment based at least in part on the data indicative of the planned motion of the autonomous vehicle comprises:

determining, by the computing system, one or more vehicle parameters based at least in part on the data indicative of a planned motion of the autonomous vehicle, wherein the one or more vehicle parameters comprise a heading of the autonomous vehicle; and determining, by the computing system, the first location for the virtual content within the virtual environment based at least in part on the one or more vehicle parameters.

6. The computer-implemented method of claim 1, wherein the data indicative of the planned motion of the autonomous vehicle comprises data indicative of a planned motion trajectory of the autonomous vehicle, and wherein the method further comprises:

providing for display within the virtual environment, by the computing system via the one or more display devices, a visual representation of the planned motion trajectory of the autonomous vehicle.

7. The computer-implemented method of claim 1, wherein the method further comprises:

obtaining, by the computing system, data indicative of an object within an interior of the autonomous vehicle; and providing for display, by the computing system via the one or more display devices, a visual representation of the object within the virtual environment.

8. The computer-implemented method of claim 1, wherein the first virtual screen and the second virtual screen are each stationary with respect to an exterior surrounding environment of the autonomous vehicle.

9. The computer-implemented method of claim 1, wherein obtaining the data indicative of the virtual content comprises:

obtaining, by the computing system, data indicative of source content; and generating, by the computing system, the virtual content based at least in part on the source content.

10. The computer-implemented method of claim 9, wherein the source content comprises two-dimensional visual content, and wherein the virtual content comprises a rendering of the two-dimensional visual content.

11. A computing system comprising:

one or more processors; and one or more tangible, non-transitory, computer readable media that collectively store instructions that when executed by the one or more processors cause the computing system to perform operations comprising:

obtaining data indicative of virtual content;

obtaining data indicative of a planned motion of an autonomous vehicle;

determining a first location for the virtual content within a virtual environment based at least in part on the data indicative of the planned motion of the autonomous vehicle, wherein the first location is associated with a first route segment of a vehicle route of the autonomous vehicle;

providing for display, via one or more display devices, the virtual content at the first location within the virtual environment, wherein the virtual content is displayed within a first virtual screen at the first location;

determining a second location for the virtual content within the virtual environment based at least in part on the data indicative of the planned motion of the autonomous vehicle, wherein the second location is associated with a second route segment of the vehicle route that is different from the first route segment, and wherein a direction of travel associated with the second route segment is different than a direction of travel associated with the first route segment;

providing for display, via the one or more display devices, the virtual content at the second location within the virtual environment, wherein the virtual content is displayed within a second virtual screen at the second location, wherein the second virtual screen and the first virtual screen are substantially similar in size, wherein at least a portion of the first virtual screen is concurrently displayed with at least a portion of the second virtual screen; and removing the first virtual screen from the virtual environment.

12. The computing system of claim 11, wherein the virtual content is displayed within the first virtual screen at the first location as the autonomous vehicle travels along the first route segment, and wherein the virtual content is displayed within the second virtual screen at the second location as the autonomous vehicle travels along the second route segment.

13. The computing system of claim 12, wherein the first virtual screen and the second virtual screen are each stationary with respect to an exterior surrounding environment of the autonomous vehicle.

14. The computing system of claim 11, wherein obtaining the data indicative of the virtual content comprises:

obtaining data indicative of source content; and generating the virtual content based at least in part on the source content.

15. The computing system of claim 14, wherein the source content comprises two-dimensional visual content, and wherein the virtual content comprises a rendering of the two-dimensional visual content.

16. The computing system of claim 11, wherein the data indicative of the planned motion of the autonomous vehicle comprises data indicative of a planned motion trajectory determined by the autonomous vehicle, and wherein the operations further comprise:

providing for display, via the one or more display devices, a visual representation of the planned motion trajectory of the autonomous vehicle within the virtual environment, wherein the visual representation is indicative of a current motion and a future motion of the autonomous vehicle.

17. One or more tangible, non-transitory computer-readable media storing computer-readable instructions that when executed by one or more processors cause the one or more processors to perform operations, the operations comprising:

obtaining data indicative of virtual content;

obtaining data indicative of a planned motion of a vehicle;

determining a first location for the virtual content within a virtual environment based at least in part on the data indicative of the planned motion of the vehicle, wherein the first location is associated with a first route segment of a vehicle route; and providing for display, via one or more display devices, the virtual content at the first location within the virtual environment, wherein the virtual content is displayed within a first virtual screen at the first location;

determining a second location for the virtual content within the virtual environment based at least in part on the data indicative of the planned motion of the vehicle, wherein the second location is associated with a second route segment of the vehicle route that is different from the first route segment, and wherein a direction of travel associated with the second route segment is different than a direction of travel associated with the first route segment;

providing for display, via the one or more display devices, the virtual content at the second location within the virtual environment, wherein the virtual content is displayed within a second virtual screen at the second location, wherein the second virtual screen and the first virtual screen are substantially similar in size, wherein at least a portion of the first virtual screen is concurrently displayed with at least a portion of the second virtual screen; and removing the first virtual screen from the virtual environment.

18. The one or more tangible, non-transitory computer-readable media of claim 17, wherein determining the first location for the virtual content within the virtual environment based at least in part on the data indicative of the planned motion of the vehicle comprises determining the first location for the virtual content based at least in part on a heading of the vehicle associated with the first route segment, and wherein providing for display, via one or more display devices, the virtual content at the first location within the virtual environment comprises providing for display, via the one or more display devices, the virtual content via the first virtual screen at the first location within the virtual environment as the vehicle travels along the first route segment of the vehicle route.

19. The one or more tangible, non-transitory computer-readable media of claim 17, wherein determining the second location for the virtual content within the virtual environment based at least in part on the data indicative of the planned motion of the vehicle comprises determining the second location for the virtual content based at least in part on a heading of the vehicle associated with the second route segment, and wherein providing for display, via one or more display devices, the virtual content at the second location within the virtual environment comprises providing for display, via the one or more display devices, the virtual content via the second virtual screen at the second location within the virtual environment as the vehicle travels along the second route segment.

\* \* \* \* \*